(12) United States Patent
Wu et al.

(10) Patent No.: US 9,281,878 B2
(45) Date of Patent: Mar. 8, 2016

(54) ARRAY ANTENNA, METHOD AND DEVICE FOR TRANSMITTING AND RECEIVING SIGNAL

(71) Applicant: Huawei Technologies Co., Ltd., Shenzhen (CN)

(72) Inventors: Tao Wu, Shenzhen (CN); Weishan Lu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/707,618

(22) Filed: May 8, 2015

(65) Prior Publication Data
US 2015/0249488 A1 Sep. 3, 2015

Related U.S. Application Data

(63) Continuation of application No. PCT/CN2013/077738, filed on Jun. 24, 2013.

(30) Foreign Application Priority Data

Jun. 24, 2013 (CN) .......................... 2012 1 0450196

(51) Int. Cl.
*H04B 7/02* (2006.01)
*H04B 7/04* (2006.01)
(Continued)

(52) U.S. Cl.
CPC .............. *H04B 7/0413* (2013.01); *H01Q 19/32* (2013.01); *H01Q 21/00* (2013.01); *H04B 7/0617* (2013.01); *H04B 7/0632* (2013.01)

(58) Field of Classification Search
CPC .. H04B 7/0413; H04B 7/0632; H04B 7/0617; H04B 7/0619; H04B 7/0626; H04B 7/08; H04Q 3/26; H04Q 3/2605

USPC ......... 375/267, 285, 295–296, 315; 455/63.1, 455/68–69, 101, 107; 342/359, 368, 371
See application file for complete search history.

(56) References Cited

U.S. PATENT DOCUMENTS

| 7,499,727 B2 * | 3/2009 | Nakaya .................. H04B 17/20 342/368 |
| 7,564,910 B2 | 7/2009 | Kostic |

(Continued)

FOREIGN PATENT DOCUMENTS

| CN | 101656346 A | 2/2010 |
| CN | 102334236 A | 2/2012 |
| CN | 102447158 A | 5/2012 |

OTHER PUBLICATIONS

Biancotto et al., "Design of a Beam Forming Dielectric Cylindrical EBG Antenna," Progress in Electromagnetics Research B, vol. 18, pp. 327-346, Institute of Electrical and Electronics Engineers, New York, New York (Nov. 16-17, 2009).

(Continued)

*Primary Examiner* — Khanh C Tran
(74) *Attorney, Agent, or Firm* — Leydig, Voit & Mayer, Ltd.

(57) ABSTRACT

The present application discloses an array antenna, a method and a device for transmitting and receiving a signal. The array antenna includes at least two active antennas, wherein each active antenna is surrounded by at least two different parasitic antennas, respective parasitic antennas are respectively coupled to controllable loads, and the controllable loads are respectively coupled to a control circuit. With the arrangement of at least two active antennas, when a channel is in a good state, channel capacity can be adjusted by adjusting the controllable loads coupled to the parasitic antennas; and when the channel is not in the good state, the bit error ratio can be reduced by both adjusting the controllable loads coupled to the parasitic antennas and adjusting transmitting directional diagrams of the active antennas according to an adjustment vector, meanwhile, miniaturization can also be realized.

12 Claims, 11 Drawing Sheets

(51) Int. Cl.
  *H01Q 21/00* (2006.01)
  *H01Q 19/32* (2006.01)
  *H04B 7/06* (2006.01)

(56) References Cited

U.S. PATENT DOCUMENTS

| | | | | |
|---|---|---|---|---|
| 2004/0248523 | A1* | 12/2004 | Nishimura | H01Q 1/245 455/78 |
| 2009/0257387 | A1* | 10/2009 | Gholmieh | H04L 5/0053 370/329 |
| 2009/0267842 | A1* | 10/2009 | Takagi | H04B 1/18 343/702 |
| 2010/0195753 | A1* | 8/2010 | Yamamoto | H01Q 1/243 375/267 |
| 2010/0201598 | A1* | 8/2010 | Lau | H01Q 21/006 343/861 |
| 2011/0116404 | A1* | 5/2011 | Shimizu | H04B 1/525 370/252 |
| 2011/0298666 | A1 | 12/2011 | Kim et al. | |
| 2012/0200158 | A1* | 8/2012 | Takei | H02J 5/005 307/31 |
| 2014/0011460 | A1* | 1/2014 | Ali | H01Q 1/243 455/75 |
| 2014/0113679 | A1* | 4/2014 | Wehrmann | H04B 1/0458 455/550.1 |

OTHER PUBLICATIONS

"3rd Generation Partnership Project; Technical Specification Group Radio Access Network; Spatial channel model for Multiple Input Multiple Output (MIMO) simulations (Release 11)," 3GPP TR 25.996, V11.0.0, 3$^{rd}$ Generation Partnership Project, Valbonne, France (Sep. 2012).

Mahdjoubi et al., "EBG Directive Antennas: Artificial EBG Surfaces and Metamaterials for Antennas," PowerPoint, Institute of Electronics & Telecommunication of Rennes, University of Rennes 1, Rennes, France (2003).

* cited by examiner

ARRAY ANTENNA, METHOD AND DEVICE FOR TRANSMITTING AND RECEIVING SIGNAL

CROSS-REFERENCE TO RELATED APPLICATIONS

This application is a continuation of International Patent Application No. PCT/CN2013/077738, filed on Jun. 24, 2013, which claims priority to Chinese Patent Application No. 201210450196.5, filed on Nov. 12, 2012, both of which are hereby incorporated by reference in their entireties.

TECHNICAL FIELD

The present application relates to the field of communications and, in particular, to an array antenna, a method and a device for transmitting and receiving a signal.

BACKGROUND

A multiple-input multiple-output (MIMO, Multiple-Input Multiple-Output) system allows multiple antennas to transmit and receive multiple spatial streams simultaneously, and is able to distinguish signals transmitted to or from different spatial orientations. Multiple parallel data streams can be made to be transported simultaneously by using the MIMO system at a transmitting end or a receiving end, which increases channel capacity, meanwhile, channel fading can be overcome significantly by using the MIMO system at the transmitting end or the receiving end, which reduces a bit error ratio.

The prior art provides a MIMO system consisting of multiple active antennas, and each active antenna is connected to a transmitting or receiving link, transmitting or receiving directional diagrams of each active antenna is adjusted by controlling the transmitting or receiving link, and thus the adjusting of channel capacity or the overcoming of channel fading is realized. However, in an existing MIMO system, since each active antenna must be connected to one transmitting or receiving link, which makes the MIMO system relatively huge and is inconvenient to realize miniaturization of the device.

SUMMARY

A technical problem that the present application aims to solve mainly is to provide an array antenna, a method and a device for transmitting and receiving a signal, which can realize miniaturization of a conventional MIMO system at the same time of realizing performances of the system.

In order to solve the above technical problem, in one aspect, the present application provides a method for transmitting data, including at least two active antennas, where each active antenna is surrounded by at least two different parasitic antennas, respective parasitic antennas are respectively coupled to controllable loads, and the controllable loads are respectively coupled to a control circuit, the method includes steps of: determining, by a signal transmitting device, whether a downlink channel is in a good state according to channel change predictions, channel quality report feedback or uplink data transmission conditions; and if the channel is in the good state, selecting an orthogonal transmitting combination, and adjusting reactance of the controllable loads via the control circuit according to the orthogonal transmitting combination to transmit data, and bearing the data of the signal transmitting device in a mode command by using a multiplexing mode to transmit data to a signal receiving device; if the channel is not in the good state, selecting a relevant transmitting combination, and adjusting the reactance of the controllable loads via the control circuit according to the relevant transmitting combination, and adjusting transmitting directional diagrams of the active antennas according to a transmitting beamforming vector to transmit data, and bearing the data of the signal transmitting device in the mode command by using a beamforming mode to transmit the data to the signal receiving device.

Before the step of selecting the orthogonal transmitting combination, the method includes a step of: traversing different reactance of the controllable loads within a predefined range to acquire multiple sets of transmitting direction vector combinations; the step of selecting the orthogonal transmitting combination includes steps of: traversing the transmitting direction vector combinations acquired to acquire at least one set of transmitting direction vector combination which enables the transmitting directional diagram of each active antenna to be orthogonal so as to form at least one set of orthogonal transmitting combinations; determining whether the downlink channel is in a slow fading condition or a fast fading condition according to the channel change predictions, the channel quality report feedback or the uplink data transmission conditions; and if the channel is in the slow fading condition, selecting from the at least one set of orthogonal transmitting combinations a set of orthogonal transmitting combination which maximizes channel capacity, and bearing the data of the signal transmitting device in the mode command by using a slow fading mode to transmit it to the signal receiving device; if the channel is in the fast fading condition, dividing time frequency resources of the transmitted data into resource blocks which have the same number as that of orthogonal transmitting combinations, where each resource block selects a set of orthogonal transmitting combination correspondingly, and bearing the data of the signal transmitting device in the mode command by using a fast fading mode to transmit the signal to the signal receiving device.

The step of selecting the relevant transmitting combination includes steps of: traversing different reactance of the controllable loads within a predefined range to acquire multiple sets of transmitting direction vector combinations; determining whether relevance of each set of transmitting direction vector combination is greater than a threshold value; if the relevance of the transmitting direction vector combination is greater than the threshold value, then storing the set of transmitting direction vector combination to form at least one set of relevant transmitting combinations; determining whether the downlink channel is in a slow fading condition or a fast fading condition according to the channel change predictions, the channel quality report feedback or the uplink data transmission conditions; and if the channel is in the slow fading condition, selecting from the at least one set of relevant transmitting combinations a set of relevant transmitting combination which maximizes a first way beam gain, and bearing the data of the signal transmitting device in the mode command by using a slow fading mode to transmit it to the signal receiving device; if the channel is in the fast fading condition, dividing time frequency resources of the transmitted data into resource blocks which have the same number as that of the relevant transmitting combinations, where each resource block selects a set of relevant transmitting combination correspondingly, and bearing the data of the signal transmitting device in the mode command by using a fast fading mode to transmit it to the signal receiving device.

The transmitting beamforming vector is a right singular vector corresponding to the first way beam gain after a singular value decomposition is performed to a channel transmission matrix.

In order to solve the above technical problem, in another aspect, the present application provides a method for receiving a signal, including at least two active antennas, where each active antenna is surrounded by at least two different parasitic antennas, respective parasitic antennas are respectively coupled to controllable loads, and the controllable loads are respectively coupled to a control circuit, the method includes steps of: receiving, by a signal receiving device, a mode command, and determining whether a signal transmitting device uses a multiplexing mode or a beamforming mode according to the mode command; and if the signal transmitting device uses the multiplexing mode, selecting an orthogonal receiving combination, and adjusting reactance of the controllable loads via the control circuit according to the orthogonal receiving combination to receive a signal; if the signal transmitting device uses the beamforming mode, selecting a relevant receiving combination, and adjusting the reactance of the controllable loads via the control circuit according to the relevant receiving combination, and adjusting receiving directional diagrams of the active antennas according to a receiving beamforming vector to receive the signal.

Before the step of selecting the orthogonal receiving combination, the method includes a step of: traversing different reactance of the controllable loads within a predefined range to acquire multiple sets of receiving direction vector combinations; the step of selecting the orthogonal receiving combination includes steps of: traversing the receiving direction vector combinations acquired to acquire at least one set of receiving direction vector combination which enables the receiving directional diagram of each active antenna to be orthogonal so as to form at least one set of orthogonal receiving combinations; determining whether the signal transmitting device uses a slow fading mode or a fast fading mode according to the mode command; and if the signal transmitting device uses the slow fading mode, selecting from the at least one set of orthogonal receiving combinations a set of orthogonal receiving combination which maximizes channel capacity; if the signal transmitting device uses the fast fading mode, dividing time frequency resources of the received signal into resource blocks which have the same number as that of orthogonal receiving combinations, where each resource block selects a set of orthogonal receiving combination correspondingly.

The step of selecting the relevant receiving combination includes steps of: traversing different reactance of the controllable loads within a predefined range to acquire multiple sets of receiving direction vector combinations; determining whether relevance of each set of receiving direction vector combination is greater than a threshold value; if the relevance of the receiving direction vector combination is greater than the threshold value, then storing the set of receiving direction vector combination to form at least one set of relevant receiving combinations; determining whether the signal transmitting device uses a slow fading mode or a fast fading mode according to the mode command; and if the signal transmitting device uses the slow fading mode, selecting from the at least one set of relevant receiving combinations a set of relevant receiving combination which maximizes a first way beam gain; if the signal transmitting device uses the fast fading mode, dividing time frequency resources of the received signal into resource blocks which have the same number as that of relevant receiving combinations, where each resource block selects a set of relevant receiving combination correspondingly.

The receiving beamforming vector is conjugation of a left singular vector corresponding to the first way beam gain after a singular value decomposition is performed to a channel transmission matrix.

In order to solve the above technical problem, in still another aspect, the present application provides a signal transmitting device, including at least two active antennas, where each active antenna is surrounded by at least two different parasitic antennas, respective parasitic antennas are respectively coupled to controllable loads, and the controllable loads are respectively coupled to a control circuit, the device further includes: a determining module and a selecting and adjusting module; the determining module is configured to determine whether a downlink channel is in a good state according to channel change predictions, channel quality report feedback or uplink data transmission conditions, and transmit a first determining result to the selecting and adjusting module; and the selecting and adjusting module is configured to receive the first determining result, and when the channel is in the good state, select an orthogonal transmitting combination, and adjust reactance of the controllable loads via the control circuit according to the orthogonal transmitting combination to transmit data, and bear the data of the signal transmitting device in a mode command by using a multiplexing mode to transmit data to a signal receiving device; when the channel is not in the good state, select a relevant transmitting combination, and adjust the reactance of the controllable loads via the control circuit according to the relevant transmitting combination, and adjust a transmitting directional diagrams of the active antennas according to a transmitting beamforming vector to transmit data, and bear the data of the signal transmitting device in the mode command by using a beamforming mode to transmit it to the signal receiving device.

The selecting and adjusting module includes a first traversing unit, a second traversing unit, a first determining unit and a first selecting unit; the first traversing unit is configured to traverse different reactance of the controllable loads within a predefined range to acquire multiple sets of transmitting direction vector combinations, and transmit the multiple sets of transmitting direction vector combinations to the second traversing unit; the second traversing unit is configured to traverse the transmitting direction vector combinations acquired to acquire at least one set of transmitting direction vector combination which enables the transmitting directional diagram of each active antenna to be orthogonal so as to form at least one set of orthogonal transmitting combinations, and transmit the at least one set of orthogonal transmitting combinations to the first selecting unit; the first determining unit is configured to determine whether the downlink channel is in a slow fading condition or in a fast fading condition according to the channel change predictions, the channel quality report feedback or the uplink data transmission conditions, and transmit a second determining result to the first selecting unit; and the first selecting unit is configured to receive the at least one set of orthogonal transmitting combinations and the second determining result, and when the channel is in the slow fading condition, select from the at least one set of orthogonal transmitting combinations a set of orthogonal transmitting combination which maximizes channel capacity, and bear the data of the signal transmitting device in the mode command by using a slow fading mode to transmit it to the signal receiving device; when the channel is in the fast fading condition, divide time frequency resources of the transmitted data into resource blocks which have the same number as that of orthogonal transmitting combinations, where each resource block selects a set of orthogonal transmitting combination correspondingly, and bear the data of the signal transmitting device in the mode command by using a fast fading mode to transmit it to the signal receiving device.

The selecting and adjusting module includes a third traversing unit, a second determining unit, a storing unit, a third determining unit and a second selecting unit; the third traversing unit is configured to traverse different reactance of the controllable loads within a predefined range to acquire multiple sets of transmitting direction vector combinations, and transmit the multiple sets of transmitting direction vector combinations to the second determining unit; the second determining unit is configured to receive the multiple sets of transmitting direction vector combinations, determine whether relevance of each set of transmitting direction vector combination is greater than a threshold value, and transmit a third determining result to the storing unit; the storing unit is configured to receive the third determining result, when the relevance of the transmitting direction vector combination is greater than the threshold value, store the set of transmitting direction vector combination to form at least one set of relevant transmitting combinations, and transmit the at least one set of relevant transmitting combinations to the second selecting unit; the third determining unit is configured to determine whether the downlink channel is in a slow fading condition or in a fast fading condition according to the channel change predictions, the channel quality report feedback or the uplink data transmission conditions, and transmit a fourth determining result to the second selecting unit; and the second selecting unit is configured to receive the at least one set of relevant transmitting combinations and the fourth determining result, and when the channel is in the slow fading condition, select from the at least one set of relevant transmitting combinations a set of relevant transmitting combination which maximizes a first way beam gain, and bear the data of the signal transmitting device in the mode command by using a slow fading mode to transmit it to the signal receiving device; when the channel is in the fast fading condition, divide time frequency resources of the transmitted data into resource blocks which have the same number as that of relevant transmitting combinations, where each resource block selects a set of relevant transmitting combination correspondingly, and bear the data of the signal transmitting device in the mode command by using a fast fading mode to transmit it to the signal receiving device.

The transmitting beamforming vector is a right singular vector corresponding to the first way beam gain after a singular value decomposition is performed to a channel transmission matrix.

In order to solve the above technical problem, in still another aspect, the present application provides a signal receiving device, including at least two active antennas, where each active antenna is surrounded by at least two different parasitic antennas, respective parasitic antennas are respectively coupled to controllable loads, and the controllable loads are respectively coupled to a control circuit, the device further includes: a determining module and a selecting and adjusting module; the determining module is configured to receive a mode command, and determine whether a signal transmitting device uses a multiplexing mode or a beamforming mode according to the mode command, and transmit a first determining result to the selecting and adjusting module; and the selecting and adjusting module is configured to receive the first determining result, and when the signal transmitting device uses the multiplexing mode, select an orthogonal receiving combination, and adjust reactance of the controllable loads via the control circuit according to the orthogonal receiving combination to receive a signal; when the signal transmitting device uses the beamforming mode, select a relevant receiving combination, and adjusting the reactance of the controllable loads via the control circuit according to the relevant receiving combination, and adjust a receiving directional diagrams of the active antennas according to a receiving beamforming vector to receive the signal.

The selecting and adjusting module includes a first traversing unit, a second traversing unit, a first determining unit and a first selecting unit; the first traversing unit is configured to traverse different reactance of the controllable loads within a predefined range to acquire multiple sets of receiving direction vector combinations, and transmit the multiple sets of receiving direction vector combinations to the second traversing unit; the second traversing unit is configured to traverse the receiving direction vector combinations acquired to acquire at least one set of receiving direction vector combination which enables the receiving directional diagram of each active antenna to be orthogonal so as to form at least one set of orthogonal receiving combinations, and transmit the at least one set of orthogonal receiving combinations to the first selecting unit; the first determining unit is configured to determine whether the signal transmitting device uses a slow fading mode or a fast fading mode according to the mode command, and transmit a second determining result to the first selecting unit; and the first selecting unit is configured to receive the at least one set of orthogonal receiving combinations and the second determining result, and when the signal transmitting device uses the slow fading mode, select from the at least one set of orthogonal receiving combinations a set of orthogonal receiving combination which maximizes channel capacity; when the signal transmitting device uses the fast fading mode, divide time frequency resources of the received signal into resource blocks which have the same number as that of orthogonal receiving combinations, where each resource block selects a set of orthogonal receiving combination correspondingly.

The selecting and adjusting module includes a third traversing unit, a second determining unit, a storing unit, a third determining unit and a second selecting unit; the third traversing unit is configured to traverse different reactance of the controllable loads within a predefined range to acquire multiple sets of receiving direction vector combinations, and transmit the multiple sets of receiving direction vector combinations to the second determining unit; the second determining unit is configured to receive the multiple sets of receiving direction vector combinations, determine whether relevance of each set of receiving direction vector combination is greater than a threshold value, and transmit a third determining result to the second selecting unit; the storing unit is configured to: when the relevance of the receiving direction vector combination is greater than the threshold value, store the set of receiving direction vector combination to form at least one set of relevant receiving combinations, and transmit the at least one set of relevant receiving combinations to the second selecting unit; the third determining unit is configured to receive the at least one set of relevant receiving combinations, determine whether the signal transmitting device uses a slow fading mode or a fast fading mode according to the mode command, and transmit a fourth determining result to the second selecting unit; and the second selecting unit is configured to receive the at least one set of relevant receiving combinations and the fourth determining result, and when the signal transmitting device uses the slow fading mode, select from the at least one set of relevant receiving combinations a set of relevant receiving combination which maximizes a first way beam gain; when the signal transmitting device uses the fast fading mode, divide time frequency resources of the received signal into resource blocks which have the same number as that of relevant receiving combinations, where each resource block selects a set of relevant receiving combination correspondingly.

The receiving beamforming vector is conjugation of a left singular vector corresponding to the first way beam gain after a singular value decomposition is performed to a channel transmission matrix.

In order to solve the above technical problem, the present application also provides an array antenna, including at least two active antennas, where each active antenna is surrounded by at least two different parasitic antennas, respective parasitic antennas are respectively coupled to controllable loads, and the controllable loads are respectively coupled to a control circuit.

With the arrangement of at least two active antennas, where each active antenna is surrounded by at least two different parasitic antennas and respective parasitic antennas are respectively coupled to controllable loads, when a channel is in a good state, a transmitting directional diagrams of each active antenna is made to be orthogonal by adjusting the controllable loads coupled to the parasitic antennas, thereby reducing relevance of the channel, and reducing the condition number of a channel transmission matrix, and thus increasing of channel capacity may be realized so as to transmit multi-stream data simultaneously; and when the channel is not in a good state, relevance of the channel is improved by both adjusting the controllable loads coupled to the parasitic antennas and adjusting a transmitting directional diagrams of the active antennas according to a receiving or transmitting beamforming vector, thereby improving the condition number of the channel transmission matrix, and thus mono-stream data may be transmitted by utilizing multiple active antennas and parasitic antennas affiliated therewith so as to realize reduction of the bit error ratio. Compared with the prior art, the number of antennas including the active antennas plus the parasitic antennas in this application may be equivalent to effects of the same number of antennas (all are active antennas) in a conventional MIMO system, furthermore, adjustment of a transmitting or receiving directional diagrams is realized by virtualizing the active antennas via the parasitic antennas and performing reactance adjustment via the controllable loads, a need for a transmitting or receiving link may be reduced (in the conventional MIMO system, each antenna is an active antenna, and thus must be connected to one transmitting or receiving link), volume of the system is reduced greatly, and thus miniaturization of the device is realized.

DESCRIPTION OF EMBODIMENTS

In the following descriptions, details about a particular system structure, interface and technology are provided for description rather than limitation so as to understand the present invention thoroughly. However, persons of ordinary skill in the art should know that the present invention may also be implemented in other embodiments without these details. In other situations, a well-known apparatus, circuit, and method are not described in detail to avoid obstruction of unnecessary details upon description of the present invention.

Figure 1:
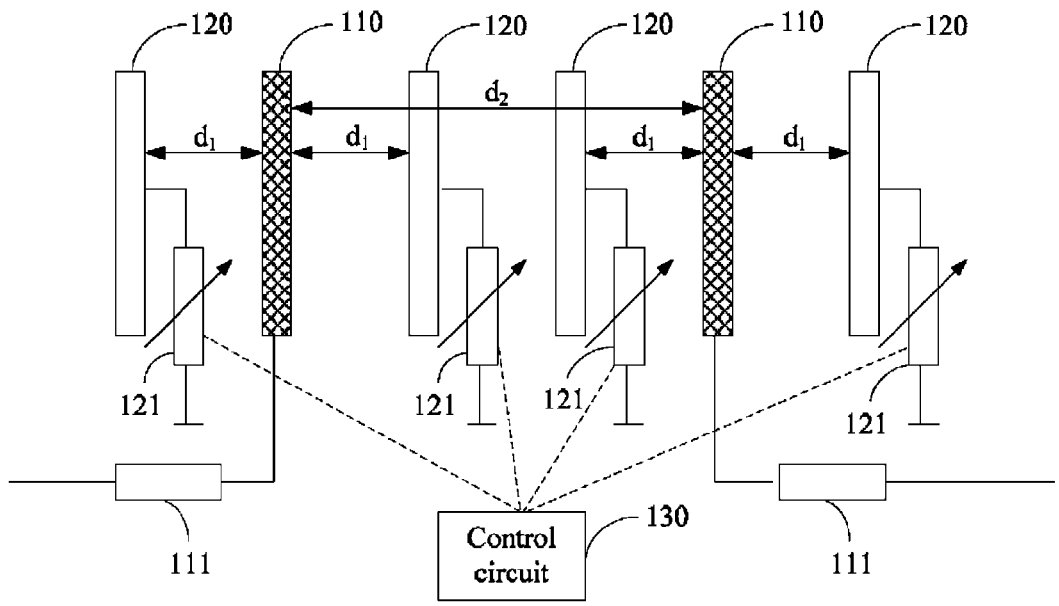
FIG. 1 is a schematic structural diagram of an array antenna according to an embodiment of the present application.

Reference may be made to FIG. 1 which is a schematic structural diagram of an array antenna according to an embodiment of the present application. The array antenna of this embodiment includes: active antennas 110, parasitic antennas 120, and a control circuit 130. The number of the active antennas 110 is at least two, each active antenna 110 is coupled to a transmitting or receiving link (not shown in the drawing) via a resistor 111, each active antenna 110 is surrounded by at least two different parasitic antennas 120, respective parasitic antennas 120 are respectively coupled to controllable loads 121, and the controllable loads 121 are respectively coupled to the control circuit 130. For ease of presentation, descriptions are made hereunder by taking an example where there are two active antennas 110, and each active antenna 110 is surrounded by two parasitic antennas 120 with an equal distance. In other embodiments, the active antennas 110 and the parasitic antennas 120 may be set according to actual needs, which will not be limited herein.

When a distance between two active antennas 110 is $d_2$, and a distance between the active antenna 110 and the parasitic antenna 120 is $d_1$, modeling is performed to a transmitting directional diagram $G(\theta)$ of the array antenna to obtain:

$$G(\theta) = a_T(\theta) w [\, s_1 \ \ 0 \ \ 0 \ \ s_2 \ \ 0 \ \ 0 \,]^T$$
$$= a_T(\theta) [\, w(1) \ \ w(4) \,][\, s_1 \ \ s_2 \,]^T$$
$$= a_T(\theta) [\, g_1 \ \ g_2 \,][\, s_1 \ \ s_2 \,]^T$$

$$a_T(\theta) = [e^{-jkd_1 \cos(\theta)} \ 1 \ e^{-j2kd_1 \cos(\theta)} \ e^{-jk(d_1+d_2)\cos(\theta)} \ e^{-jkd_2 \cos(\theta)} \ e^{-jk(2d_1+d_2)\cos(\theta)}],$$

$$k = \frac{2\pi}{\lambda},$$

$\lambda$ is a wavelength of a transmitted wave, $\theta$ is a departure angle of the transmitted wave, $a_T(\theta)$ is a spatial feature vector of the array antenna in the direction of $\theta$.

$w = (Z+X)^{-1}$, $w(1)$ is the first column of $w$, $w(4)$ is the fourth column of $w$, $g_1 = w(1)$, $g_2 = w(4)$, $$Z = \begin{bmatrix} z_{11} & z_{12} & z_{13} & z_{14} & z_{15} & z_{16} \\ z_{21} & z_{22} & z_{23} & z_{24} & z_{25} & z_{26} \\ z_{31} & z_{32} & z_{33} & z_{34} & z_{35} & z_{36} \\ z_{41} & z_{42} & z_{43} & z_{44} & z_{45} & z_{46} \\ z_{51} & z_{52} & z_{53} & z_{54} & z_{55} & z_{56} \\ z_{61} & z_{62} & z_{63} & z_{64} & z_{65} & z_{66} \end{bmatrix}$$

$$X = \begin{bmatrix} R & 0 & 0 & 0 & 0 & 0 \\ 0 & jX_1 & 0 & 0 & 0 & 0 \\ 0 & 0 & jX_2 & 0 & 0 & 0 \\ 0 & 0 & 0 & R & 0 & 0 \\ 0 & 0 & 0 & 0 & jX_3 & 0 \\ 0 & 0 & 0 & 0 & 0 & jX_4 \end{bmatrix}$$

Matrix Z is an impedance array of all antennas (including the active antennas 110 and the parasitic antennas 120), where elements of the diagonal line are self-impedance values of the antennas, and elements of the non-diagonal line are mutual impedance values between the antennas. R in Matrix X is a resistance value of a resistor 111 coupled to the active antenna 110, and $jX_1, jX_2, jX_3, jX_4$ are respectively reactance values of the controllable loads 121 from the left to the right in FIG. 1.

$s_1$ and $s_2$ are signals inputted to two active antennas 110 respectively, when the channel is in a good state and it is suitable for two-stream data transmission, $s_1$ and $s_2$ are two different data flows, when the channel is in a not good state and it is only suitable for one-stream data transmission, $s_1$ and $s_2$ are results obtained by controlling the phase and the amplitude for data of the same stream in two active antennas 110 respectively.

It can be seen from the modeling of the transmitting directional diagrams $G(\theta)$ of the above array antenna that, transmitting directional diagrams of two active antennas 110 are respectively $G_1(\theta) = a_T(\theta) g_1$ and $G_2(\theta) = a_T(\theta) g_2$, the transmitting directional diagrams of two active antennas 110 may change correspondingly by adjusting $g_1$ and $g_2$. Moreover, $g_1$ and $g_2$ are related to $jX_1, jX_2, jX_3, jX_4$, different transmitting direction vector combinations $\{g_1 g_2\}$, including an orthogonal transmitting combination that enables the transmitting directional diagrams of two active antennas 110 to be orthogonal and a relevant transmitting combination that enables $g_1$ and $g_2$ to be relevant, may be acquired by adjusting $jX_1, jX_2, jX_3, jX_4$.

Channel transmission matrix $\tilde{H} = H [g_1 \ g_2]$ may be obtained by modeling a channel transmission matrix, where H is a non-coupled channel, it can be seen from the modeling of the channel transmission matrix that, the channel transmission matrix is related to $g_1$ and $g_2$, thus relevance of the channel may be adjusted at the time of adjusting $g_1$ and $g_2$. Moreover, when $jX_1, jX_2, jX_3, jX_4$ are adjusted so as to acquire the orthogonal transmitting combination, the relevance of the channel will be reduced, thereby reducing the condition number of the channel transmission matrix to realize both increase of channel capacity and transmission of multi-stream data; when $jX_1, jX_2, jX_3, jX_4$ are adjusted so as to acquire the relevant transmitting combination, the relevance of the channel will be enhanced, thereby increasing the condition number of the channel transmission matrix, and thus mono-stream data may be transmitted by utilizing multiple active antennas and parasitic antennas affiliated therewith so as to realize reduction of the bit error ratio.

Figure 2:
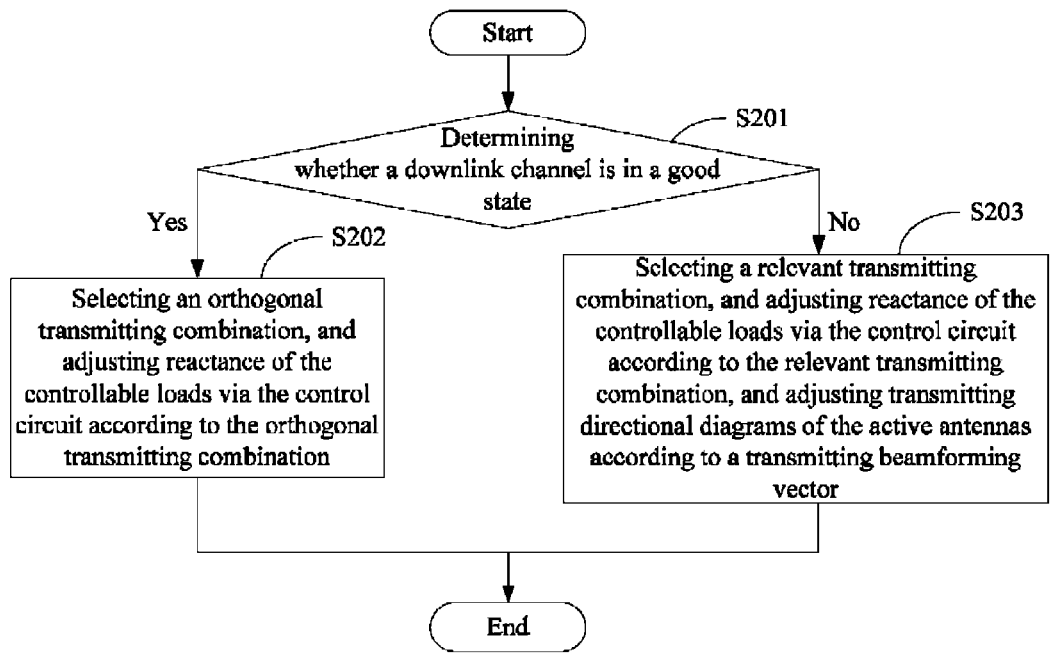
FIG. 2 is a flow chart of a method for transmitting data according to an embodiment of the present application.

Reference may be made to FIG. 2 which is a flow chart of a method for transmitting data according to an embodiment of the present application. The method for transmitting data in this embodiment includes steps of:

S201: determining, by a signal transmitting device, whether a downlink channel is in a good state according to channel change predictions, channel quality report feedback or uplink data transmission conditions. If the channel is in the good state, the method proceeds to S202; if the channel is in a not good state, the method proceeds to S203.

S202: selecting, by the signal transmitting device, an orthogonal transmitting combination, and adjusting reactance of the controllable loads via a control circuit according to the orthogonal transmitting combination to transmit data, and bearing the data of the signal transmitting device in a mode command by using a multiplexing mode to transmit data to a signal receiving device.

The downlink channel has a lower bit error ratio in the good state than in the not good state, thus, when the downlink channel is in the good state, the signal transmitting device selects the orthogonal transmitting combination to reduce the relevance of the channel, thereby realizing both increase of channel capacity and transmission of multi-stream data. After selecting a proper orthogonal transmitting combination, the signal transmitting device adjusts reactance of the controllable loads via the control circuit to acquire the orthogonal transmitting combination as desired to transmit data, and bears the data of the signal transmitting device in a mode command by using a multiplexing mode to transmit data to the signal receiving device. The orthogonal transmitting combination is a transmitting direction vector combination that enables transmitting directional diagram of each active antenna to be orthogonal.

S203: selecting, by the signal transmitting device, a relevant transmitting combination, and adjusting reactance of the controllable loads via the control circuit according to the relevant transmitting combination, and adjusting transmitting directional diagrams of the active antennas according to a transmitting beamforming vector to transmit data, and bearing the data of the signal transmitting device in a mode command by using a beamforming mode to transmit it to the signal receiving device.

The downlink channel has a higher bit error ratio in the not good state than in the good state, thus, when the downlink channel is not in the good state, the signal transmitting device selects the relevant transmitting combination to improve relevance of the channel, and thus mono-stream data may be transmitted by utilizing multiple active antennas and parasitic antennas affiliated therewith so as to realize reduction of the bit error ratio. After selecting a proper relevant transmitting combination, the signal transmitting device adjusts reactance of the controllable loads via the control circuit to acquire the relevant transmitting combination as desired and adjusts a transmitting beamforming vector via a transmitting link so as to adjust transmitting directional diagrams of the active antennas to transmit data, and bears the data of the signal transmitting device in a mode command by using a beamforming mode to transmit it to the signal receiving device.

Figure 3:
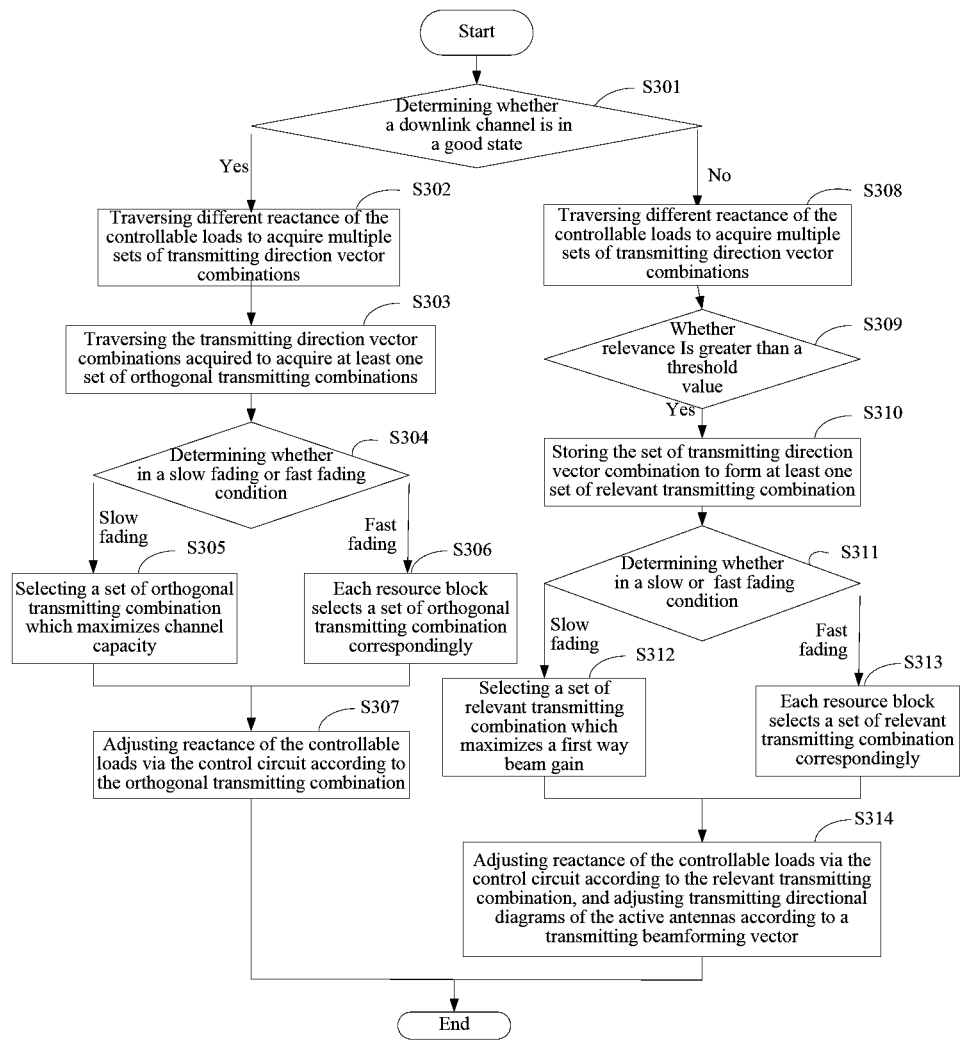
FIG. 3 is a flow chart of a method for transmitting data according to another embodiment of the present application.

Reference may be made to FIG. 3 which is a flow chart of a method for transmitting data according to another embodiment of the present application. The method for transmitting data in this embodiment includes steps:

S301: determining, by a signal transmitting device, whether a downlink channel is in a good state according to channel change predictions, channel quality report feedback or uplink data transmission conditions.

If the channel is in a good state, the signal transmitting device is suitable for selecting an orthogonal transmitting combination to reduce relevance of the channel, and bears the data of the signal transmitting device in a mode command by using a multiplexing mode to transmit data to a signal receiving device, thereby realizing both increase of channel capacity and transmission of multi-stream data, and thus the method proceeds to S302; if the channel is in a not good state, the signal transmitting device is suitable for selecting a relevant transmitting combination and bears the data of the signal transmitting device in a mode command by using a beamforming mode to transmit it to a signal receiving device so as to improve relevance of the channel, and thus mono-stream data may be transmitted by utilizing multiple active antennas and parasitic antennas affiliated therewith, and the bit error ratio is reduced, and thus the method proceeds to S308.

S302: traversing, by the signal transmitting device, different reactance of controllable loads within a predefined range to acquire multiple sets of transmitting direction vector combinations.

In this embodiment, reactance of the controllable loads may be predefined in an interval of [−100j,100j], and multiple sets of transmitting direction vector combinations may be acquired by traversing different reactance of the controllable loads.

S303: traversing, by the signal transmitting device, the transmitting direction vector combinations acquired to acquire at least one set of transmitting direction vector combination which enables the transmitting directional diagram of each active antenna to be orthogonal so as to form at least one set of orthogonal transmitting combination.

The orthogonal transmitting combination enables the transmitting directional diagram of each active antenna to be orthogonal, and thus it satisfies the following formula:

$$\frac{\left|\int_0^{2\pi} a_T(\theta)g_1(a_T(\theta)g_2)^H\,d\theta\right|}{\sqrt{\int_0^{2\pi} a_T(\theta)g_1(a_T(\theta)g_1)^H\,d\theta}\sqrt{\int_0^{2\pi} a_T(\theta)g_2(a_T(\theta)g_2)^H\,d\theta}} = 0,$$

where, $a_T(\theta)$, $g_1$ and $g_2$ are defined as above, which will not be repeated herein.

The signal transmitting device traverses the transmitting direction vector combinations acquired, multiple sets of transmitting direction vector combinations acquired from the previous step are substituted to the formula respectively, if the formula is satisfied, then the transmitting direction vector combinations are the orthogonal transmitting combinations, thereby acquiring at least one set of orthogonal transmitting combination.

S304: determining, by the signal transmitting device, whether the downlink channel is in a slow fading or fast fading condition according to the channel change predictions, the channel quality report feedback or the uplink data transmission conditions.

If the downlink channel is in the slow fading condition, the channel changes slowly, there is sufficient time to firstly acquire an orthogonal transmitting combination that maximizes the channel capacity, and thus the method proceeds to S305; if the downlink channel is in the fast fading condition, the channel changes relatively fast, if a method is employed, where the orthogonal transmitting combination that maximizes the channel capacity is sought out firstly, and then reactance of the controllable loads is adjusted, it may result in that channel conditions have changed when the orthogonal transmitting combination that maximizes the channel capacity is sought out, and expected results cannot be achieved, and thus the method proceeds to S306.

S305: selecting, by the signal transmitting device, from the at least one set of orthogonal transmitting combinations a set of orthogonal transmitting combination which maximizes the channel capacity, and bearing the data of the signal transmitting device in a mode command by using a slow fading mode to transmit it to the signal receiving device.

Figure 4:
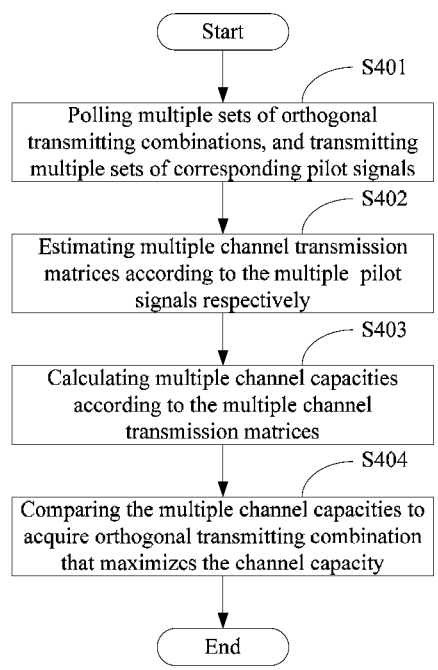
FIG. 4 is a flow chart of a step of selecting a set of orthogonal transmitting combination which maximizes channel capacity as shown in FIG. 3.

Reference may also be made to FIG. 4 which is a flow chart of a step of selecting a set of orthogonal transmitting combination which maximizes the channel capacity as shown in FIG. 3. The step of selecting the set of orthogonal transmitting combination which maximizes the channel capacity includes the following steps:

S401: polling, by the signal transmitting device, multiple sets of orthogonal transmitting combinations, and transmitting multiple corresponding pilot signals.

The signal transmitting device selects from multiple sets of orthogonal transmitting combinations a set of orthogonal transmitting combination by serial number, and adjusts reactance of the controllable loads according to the set of orthogonal transmitting combination, then transmits a corresponding pilot signal to the signal receiving device under the adjusted controllable loads, and then selects next set of orthogonal transmitting combination by the serial number until corresponding pilot signals of the multiple sets of orthogonal transmitting combinations are transmitted.

S402: estimating, by the signal receiving device, multiple channel transmission matrices according to multiple sets of pilot signals, respectively.

Since the signal transmitting device has different channel transmission matrices in different orthogonal transmitting combinations, thus, the signal receiving device, after receiving multiple pilot signals by the serial number, estimates a channel transmission matrix corresponding to each set of orthogonal transmitting combination according to the pilot signals respectively. The signal receiving device is prestored with pilot signals, hence, the signal receiving device, after receiving the pilot signals transmitted by the signal transmitting device, compares the pilot signals received with the pilot signals stored locally to obtain the channel transmission matrices.

S403: calculating, by the signal receiving device, multiple channel capacities according to the multiple channel transmission matrices.

After obtaining the channel transmission matrix corresponding to each set of orthogonal transmitting combination through calculation, the signal receiving device obtains channel capacity corresponding to each set of orthogonal transmitting combination through calculation according to the following formula.

$$C_m = \log_2 \det\left(I_2 + \frac{P_{total}}{2\sigma^2} \tilde{H}_m \tilde{H}_m^H\right)$$

where, m∈M, M is total amount of the orthogonal transmitting combinations, m represents one set of the orthogonal transmitting combination therein, $C_m$ is a channel capacity corresponding to the $m^{th}$ orthogonal transmitting combination, $I_2$ is a second-order unit matrix, $P_{total}$ is total transmitting power, $\sigma^2$ is noise variance, and $\tilde{H}_m$ is a channel transmission matrix corresponding to the $m^{th}$ orthogonal transmitting combination.

S404: comparing, by the signal receiving device, the multiple channel capacities to acquire orthogonal transmitting combination that maximizes the channel capacity.

After obtaining the channel capacity corresponding to each set of orthogonal transmitting combination through calculation, the signal receiving device compares the channel capacity corresponding to each set of orthogonal transmitting combination to acquire the orthogonal transmitting combination that maximize the channel capacity, and transmits serial number corresponding to the set of orthogonal transmitting combination to the signal receiving device.

In summary, the signal transmitting device selects from at least one set of orthogonal transmitting combination one set of orthogonal transmitting combination that maximizes the channel capacity when a downlink channel is in a slow fading condition, and bears the data of the signal transmitting device in a mode command by using a slow fading mode to transmit it to the signal receiving device, and then the method proceeds to S307.

S306: dividing, by the signal transmitting device, time frequency resources of transmitted data into resource blocks which have the same number as that of orthogonal transmitting combinations, where each resource block selects a set of orthogonal transmitting combination correspondingly, and bearing the data of the signal transmitting device in a mode command by using a fast fading mode to transmit it to the signal receiving device.

When the downlink channel is in the fast fading condition, time frequency resources of the transmitted data are divided into resource blocks which have the same number as that of orthogonal transmitting combinations, where each resource block selects a set of orthogonal transmitting combination correspondingly, and thus results of selecting the orthogonal transmitting combinations quickly are achieved, then, the method proceeds to S307.

S307: adjusting, by the signal transmitting device, reactance of the controllable loads via the control circuit according to the orthogonal transmitting combination to transmit data.

When the downlink channel is in the slow fading condition, the signal transmitting device receives serial number transmitted by the signal receiving device, and selects a set of orthogonal transmitting combination corresponding to the serial number by the serial number, then, adjusts reactance of the controllable loads via the control circuit to acquire the set of orthogonal transmitting combination.

When the downlink channel is in the fast fading condition, the signal transmitting device bears the data of the signal transmitting device in a mode command by using the fast fading mode to transmit it to the signal receiving device, and selects a first set of orthogonal transmitting combination in a first block of the time frequency resources, then, the control circuit adjusts reactance of the controllable loads to acquire the first set of orthogonal transmitting combination. The next time frequency resource selects next set of orthogonal transmitting combination till the last set of orthogonal transmitting combination is selected, which then reselects a first set of orthogonal transmitting combination until all data are transmitted.

S308: traversing, by the signal transmitting device, different reactance of controllable loads within a predefined range to acquire multiple sets of transmitting direction vector combinations.

In this embodiment, reactance of the controllable loads may be predefined in an interval of [−100j,100j], and multiple sets of transmitting direction vector combinations may be acquired by traversing different reactance of the controllable loads.

S309: determining, by the signal transmitting device, whether relevance of each set of transmitting direction vector combination is greater than a threshold value.

The signal transmitting device, after acquiring the multiple sets of transmitting direction vector combinations, determines whether relevance of each set of transmitting direction vector combination is greater than a threshold value according to the following formula. A range of the threshold value is [0,1], the threshold value is larger, and the relevance is higher. In this embodiment, the threshold value may be set to 0.6.

$$\rho_{g_1,g_2} = \frac{|g_1^H g_2|}{\sqrt{g_1^H g_1}\sqrt{g_2^H g_2}} > \varepsilon$$

$\rho_{g_1,g_2}$ is relevance of each set of transmitting direction vector combination, $\varepsilon$ is a threshold value, $g_1$ and $g_2$ are defined as above, which will not be repeated herein.

If the relevance of transmitting direction vector combination is greater than the threshold value, the method proceeds to S310, otherwise, no processing is performed.

S310: storing, by the signal transmitting device, the set of transmitting direction vector combination to form at least one set of relevant transmitting combination.

The signal transmitting device locally stores a transmitting direction vector combination whose relevance is greater than the threshold value to be regarded as a relevant transmitting combination.

S311: determining, by the signal transmitting device, whether the downlink channel is in a slow fading condition or in a fast fading condition according to channel predictions or channel estimations.

If the downlink channel is in the slow fading condition, the channel changes slowly, there is sufficient time to firstly acquire a relevant transmitting combination that maximizes a first way beam gain, and thus the method proceeds to S312; if the downlink channel is in the fast fading condition, the channel changes relatively fast, if a method is employed, where a relevant transmitting combination that maximizes a first way beam gain is sought out firstly, it may result in that channel conditions have changed when the relevant transmitting combination that maximizes the first way beam gain is acquired, and expected results cannot be achieved, and thus the method proceeds to S313.

S312: selecting, by the signal transmitting device, from the at least one set of relevant transmitting combinations a set of relevant transmitting combination which maximizes the first way beam gain, and bearing the data of the signal transmitting device in a mode command by using a slow fading mode to transmit it to the signal receiving device.

Figure 5:
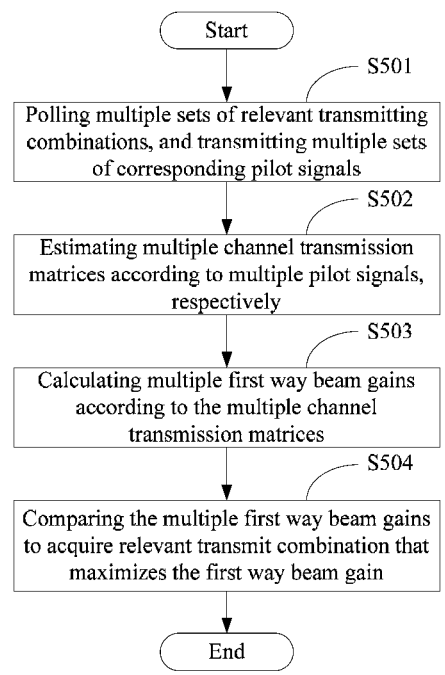
FIG. 5 is a flow chart of a step of selecting a set of relevant transmitting combinations which maximizes a first way beam gain as shown in FIG. 3.

Reference may also be made to FIG. 5 which is a flow chart of a step of selecting a set of relevant transmitting combination which maximizes the first way beam gain as shown in FIG. 3. The step of selecting the set of relevant transmitting combination which maximizes the first way beam gain includes the following steps:

S501: polling, by the signal transmitting device, multiple sets of relevant transmitting combinations, and transmitting multiple corresponding pilot signals.

The signal transmitting device selects from multiple sets of relevant transmitting combinations a set of relevant transmitting combination by serial number, and adjusts reactance of the controllable loads according to the set of relevant transmitting combination, then transmits a corresponding pilot signal to the signal receiving device under the adjusted controllable loads, and then selects next set of relevant transmitting combination by the serial number until corresponding pilot signals of the multiple sets of relevant transmitting combinations are transmitted.

S502: estimating, by the signal receiving device, multiple channel transmission matrices according to multiple sets of pilot signals, respectively.

Since the signal transmitting device has different channel transmission matrices in different relevant transmitting combinations, thus, the signal receiving device, after receiving multiple pilot signals by the serial number, estimates a channel transmission matrix corresponding to each set of relevant transmitting combination according to the pilot signals respectively. The signal receiving device is prestored with pilot signals, hence, the signal receiving device, after receiving the pilot signals transmitted by the signal transmitting device, compares the pilot signals received with the pilot signals stored locally to obtain the channel transmission matrices.

S503: obtaining, by the signal receiving device, multiple first way beam gains through calculation according to the multiple channel transmission matrices.

After the signal receiving device obtains the channel transmission matrix corresponding to each set of relevant transmitting combination through calculation, a singular value decomposition may be performed to the channel transmission matrix so as to acquire the first way beam gain corresponding to each set of relevant transmitting combination. A formula of the singular value decomposition is as follows:

$$H[g_{1,n}\ g_{2,n}] = [U_{1,n}\ U_{2,n}]\begin{bmatrix}\lambda_1(H[g_{1,n}\ g_{2,n}]) & 0 \\ 0 & \lambda_2(H[g_{1,n}\ g_{2,n}])\end{bmatrix}[V_{1,n}\ V_{2,n}]^H$$

$n \in N$, N is total amount of the relevant transmitting combinations, n represents one set of the relevant transmitting combination, $H[g_{1,n}\ g_{2,n}]$ is a channel transmission matrix corresponding to the $n^{th}$ relevant transmitting combination, $\lambda_1(H[g_{1,n}\ g_{2,n}])$ is a first way beam gain, $\lambda_2(H[g_{1,n}\ g_{2,n}])$ is a second way beam gain, and $$\lambda_1(H[g_{1,n}\ g_{2,n}]) \geq \lambda_2(H[g_{1,n}\ g_{2,n}]) \geq 0,$$

$U_{1,n}$, $U_{2,n}$ are left singular vectors corresponding to the first way beam gain and the second way beam gain respectively, whereas $V_{1,n}$, $V_{2,n}$ are right singular vectors corresponding to the first way beam gain and the second way beam gain respectively.

S504: comparing, by the signal receiving device, the multiple first way beam gains to acquire relevant transmitting combination that maximizes the first way beam gain.

After obtaining the first way beam gain corresponding to each set of relevant transmitting combination through calculation, the signal receiving device compares the first way beam gain corresponding to each set of relevant transmitting combination to acquire relevant transmitting combination that maximize the first way beam gain, and transmits serial number corresponding to the set of relevant transmitting combination and a right singular vector corresponding to the first way beam gains to the signal receiving device.

If the signal transmitting device has been stored with right singular vectors corresponding to the respective relevant transmitting combinations, it may also transmit serial number corresponding to the set of relevant transmitting combination to the signal receiving device only, the signal receiving device, after receiving the serial number, searches locally to obtain the corresponding right singular vector.

In summary, the signal transmitting device selects from at least one set of relevant transmitting combinations a set of relevant transmitting combination that maximizes a first way beam gain when a downlink channel is in a slow fading condition, and bears the data of the signal transmitting device in a mode command by using a slow fading mode to transmit it to the signal receiving device, and then proceed to S314.

S313: dividing, by the signal transmitting device, time frequency resources of transmitted data into resource blocks which have the same number as that of relevant transmitting combinations, where each resource block selects a set of relevant transmitting combination correspondingly, and bearing the data of the signal transmitting device in a mode command by using a fast fading mode to transmit it to the signal receiving device.

When the downlink channel is in the fast fading condition, the signal transmitting device divides time frequency resources of the transmitted data into resource blocks which have the same number as that of relevant transmitting combinations.

Figure 6:
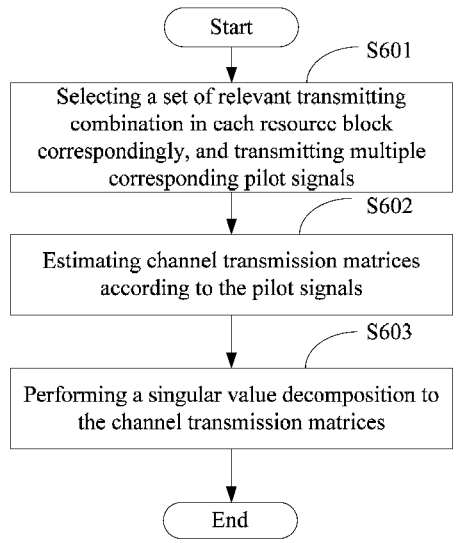
FIG. 6 is a flow chart of a step where each resource block selects a set of relevant transmitting combinations correspondingly as shown in FIG. 3.

Reference may be made to FIG. 6 which is a flow chart of a step where each resource block selects a set of relevant transmitting combination correspondingly as shown in FIG. 3. The step where each resource block selects a set of relevant transmitting combination correspondingly includes the following steps:

S601: selecting, by the signal transmitting device, a set of relevant transmitting combination in each resource block correspondingly, and transmitting multiple corresponding pilot signals.

The signal transmitting device selects a set of relevant transmitting combination in each resource block by serial number, and adjusts reactance of the controllable loads according to the set of relevant transmitting combination, and then transmits corresponding pilot signals to the signal receiving device under the adjusted controllable loads.

S602: estimating, by the signal receiving device, channel transmission matrices according to the pilot signals.

Since the signal transmitting device must adjust transmitting directional diagrams of the active antennas according to a right singular vector, thus, the signal receiving device, after receiving the pilot signals, must estimate channel transmission matrices according to the pilot signals, so that a singular value decomposition is performed to the channel transmission matrices, thereby obtaining the right singular vector. The signal receiving device is prestored with pilot signals, hence, the signal receiving device, after receiving the pilot signals transmitted by the signal transmitting device, compares the pilot signals received with the pilot signals stored locally to obtain the channel transmission matrices.

S603: performing, by the signal receiving device, a singular value decomposition to the channel transmission matrices. A process of the singular value decomposition to the channel transmission matrices is similar to a process of the singular value decomposition in S503, which will not be repeated herein.

The signal receiving device, after performing a singular value decomposition to the channel transmission matrices, transmits a right singular vector to the signal transmitting device. If the signal transmitting device has been stored with right singular vectors corresponding to respective set of the relevant transmitting combinations, the signal receiving device may also transmit serial number to the signal transmitting device, the signal transmitting device, after receiving the serial number, searches locally according to the serial number to obtain corresponding right singular vectors.

S314: adjusting, by the signal transmitting device, reactance of the controllable loads via the control circuit according to the relevant transmitting combination, and adjusting transmitting directional diagrams of the active antennas according to a transmitting beamforming vector, where the transmitting beamforming vector is a right singular vector corresponding to the first way beam gain after a singular value decomposition is performed to a channel transmission matrix.

When the downlink channel is in the slow fading condition, the signal transmitting device receives serial number and the right singular vector transmitted by the signal receiving device, and selects a set of relevant transmitting combination corresponding to the serial number according to the serial number, then, adjusts reactance of the controllable loads via the control circuit to acquire the set of relevant transmitting combination, and adjusts transmitting directional diagrams of the active antennas via a transmitting link according to the right singular vector.

When the downlink channel is in the fast fading condition, the signal transmitting device selects a first set of relevant transmitting combination in a first block of the time frequency resources, and receives the right singular vector transmitted by the signal receiving device, then, the control circuit adjusts reactance of the controllable loads to acquire the first set of relevant transmitting combination, and adjusts the transmitting directional diagrams of the active antennas via the transmitting link according to the right singular vector. The next time frequency resource selects next set of relevant transmitting combination and receives the right singular vector transmitted by the signal receiving device till the last set of relevant transmitting combination is selected, which then reselects a first set of relevant transmitting combination until all data are transmitted.

Reference may be made to FIG. 1 again, in a structure of the array antenna as shown in FIG. 1, when the distance between two active antennas 110 is $d_1$, and the distance between the active antennas 110 and the parasitic antennas 120 is $d_2$, a receiving voltage at a receiving link end is:

$$[v_1 0 \, 0 v_2 0 \, 0]^T = w^H a_R(\theta) s(t)$$

$$[v_1 v_2]^T = [w(1) w(4)]^H a_R(\theta) s(t)$$

$$[v_1 v_2]^T = [g_1 g_2]^H a_R(\theta) s(t)$$

$v_1$, $v_2$ are receiving voltages of two active antennas 110 at receiving link ends respectively.

$w = (Z+X)^{-1}$, $w(1)$ is the first column of w, $w(4)$ is the fourth column of w, $g_1 = w(1)$, $g_2 = w(4)$, $$Z = \begin{bmatrix} z_{11} & z_{12} & z_{13} & z_{14} & z_{15} & z_{16} \\ z_{21} & z_{22} & z_{23} & z_{24} & z_{25} & z_{26} \\ z_{31} & z_{32} & z_{33} & z_{34} & z_{35} & z_{36} \\ z_{41} & z_{42} & z_{43} & z_{44} & z_{45} & z_{46} \\ z_{51} & z_{52} & z_{53} & z_{54} & z_{55} & z_{56} \\ z_{61} & z_{62} & z_{63} & z_{64} & z_{65} & z_{66} \end{bmatrix}$$

$$X = \begin{bmatrix} R & 0 & 0 & 0 & 0 & 0 \\ 0 & jX_1 & 0 & 0 & 0 & 0 \\ 0 & 0 & jX_2 & 0 & 0 & 0 \\ 0 & 0 & 0 & R & 0 & 0 \\ 0 & 0 & 0 & 0 & jX_3 & 0 \\ 0 & 0 & 0 & 0 & 0 & jX_4 \end{bmatrix}$$

Matrix Z is an impedance array of all antennas (including the active antennas 110 and the parasitic antennas 120), where elements of the diagonal line are self-impedance values of the antennas, and elements of the non-diagonal line are mutual impedance values between the antennas. R in Matrix X is a resistance value of a resistor 111 coupled to the active antenna 110, and $jX_1$, $jX_2$, $jX_3$, $jX_4$ are respectively reactance values of the controllable loads 121 from the left to the right in FIG. 1.

$a_R(\theta) = [e^{-jkd_1 \cos(\theta)} \, 1 \, e^{-j2kd_1 \cos(\theta)} \, e^{-jk(d_1+d_2)\cos(\theta)} \, e^{-jkd_2 \cos(\theta)} \, e^{-jk(2d_1+d_2)\cos(\theta)}]$, $$k = \frac{2\pi}{\lambda},$$

$\lambda$ is a wavelength of a received wave, $\theta$ is an incidence angle of the received wave, $a_R(\theta)$ is a spatial feature vector of the array antenna in the direction of $\theta$.

s(t) represents the amplitude and the phase of a far field current in the incidence angle of $\theta$.

It can be seen from the above that, receiving directional diagrams of two active antennas 110 are respectively $G_1(\theta) = g_1^H a_R(\theta)$ and $G_2(\theta) = g_2^H a_R(\theta)$, the receiving directional diagrams of two active antennas 110 may change correspondingly by adjusting $g_1$ and $g_2$. Moreover, $g_1$ and $g_2$ are related to $jX_1$, $jX_2$, $jX_3$, $jX_4$, different receiving direction vector combinations $\{g_1 g_2\}$, including an orthogonal receiving combination that enables the receiving directional diagrams of two active antennas 110 to be orthogonal and a relevant receiving combination that enables $g_1$ and $g_2$ to be relevant, may be acquired by adjusting $jX_1$, $jX_2$, $jX_3$, $jX_4$.

Channel transmission matrix $H = [g_1 \, g_2]^H$ H may be obtained by modeling a channel transmission matrix, it can be seen from the modeling of the channel transmission matrix that, the channel transmission matrix is related to $g_1$ and $g_2$, thus relevance of the channel may be adjusted at the time of adjusting $g_1$ and $g_2$, thereby receiving data transmitted by the signal transmitting device by using a multiplexing mode.

When $jX_1$, $jX_2$, $jX_3$, $jX_4$ are adjusted so as to acquire the relevant receiving combination, the relevance of the channel will be enhanced, thereby increasing the condition number of the channel transmission matrix to realize receiving of data transmitted by the signal transmitting device by using a beamforming mode, and thus the bit error ratio is reduced.

Figure 7:
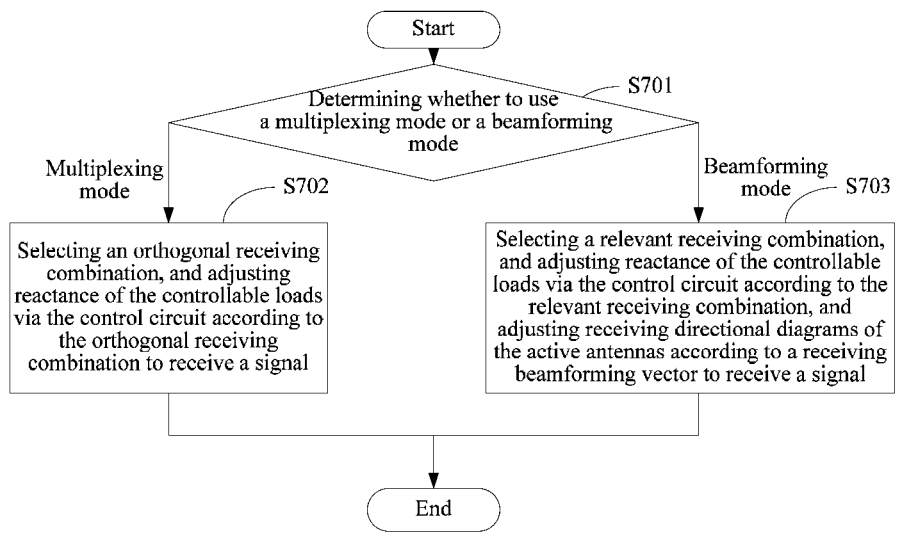
FIG. 7 is a flow chart of a method for receiving data according to an embodiment of the present application.

Reference may be made to FIG. 7 which is a flow chart of a method for receiving data according to an embodiment of the present application. The method for receiving data in this embodiment includes the following steps:

S701: receiving, by a signal receiving device, a mode command, and determining whether a signal transmitting device uses a multiplexing mode or a beamforming mode according to the mode command. If the signal transmitting device uses the multiplexing mode, the method proceeds to S702; if the signal transmitting device uses the beamforming mode, the method proceeds to S703.

S702: selecting, by the signal receiving device, an orthogonal receiving combination, and adjusting reactance of controllable loads via the control circuit according to the orthogonal receiving combination to receive data.

If the signal transmitting device uses the multiplexing mode, the signal receiving device also selects the orthogonal transmitting combination to reduce relevance of the channel The signal transmitting device, after selecting a proper orthogonal receiving combination, adjusts reactance of the controllable loads via the control circuit to acquire the orthogonal receiving combination as desired. The orthogonal receiving combination is a receiving direction vector combination that enables receiving directional diagram of each active antenna to be orthogonal.

S703: selecting, by the signal receiving device, a relevant receiving combination, and adjusting reactance of the controllable loads via the control circuit according to the relevant receiving combination, and adjusting receiving directional diagrams of the active antennas according to a receiving beamforming vector to receive data.

If the signal transmitting device uses the beamforming mode, the signal receiving device also selects the relevant transmitting combination to improve relevance of the channel The signal receiving device, after selecting a proper relevant receiving combination, adjusts reactance of the controllable loads via the control circuit to acquire the relevant receiving combination as desired, and adjusts a receiving beamforming vector via a receiving link, thereby adjusting receiving directional diagrams of the active antennas to receive data.

Figure 8:
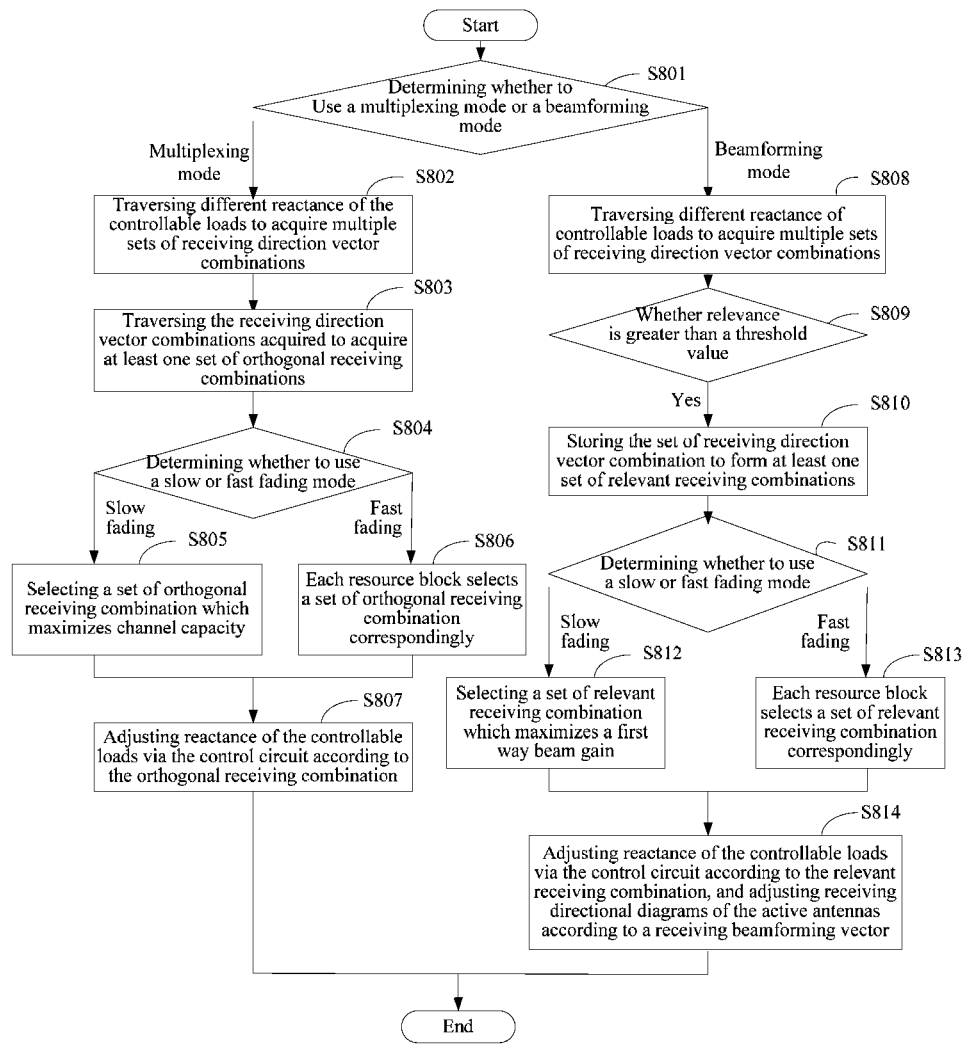
FIG. 8 is a flow chart of a method for receiving data according to another embodiment of the present application.

Reference may be made to FIG. 8 which is a flow chart of a method for receiving data according to another embodiment of the present application. The method for receiving data in this embodiment includes the following steps:

S801: receiving, by a signal receiving device, a mode command, and determining whether a signal transmitting device uses a multiplexing mode or a beamforming mode according to the mode command If the signal transmitting device uses the multiplexing mode, the signal receiving device is suitable for selecting an orthogonal receiving combination to reduce relevance of the channel, and thus the method proceeds to S802; if the signal transmitting device uses the beamforming mode, the signal receiving device is suitable for selecting a relevant receiving combination to improve relevance of the channel, and thus the method proceeds to S808.

S802: traversing, by the signal receiving device, different reactance of controllable loads within a predefined range to acquire multiple sets of receiving direction vector combinations.

In this embodiment, reactance of the controllable loads may be predefined in an interval of [−100j,100j], and multiple sets of receiving direction vector combinations may be acquired by traversing different reactance of the controllable loads.

S803: traversing, by the signal receiving device, the receiving direction vector combinations acquired to acquire at least one set of receiving direction vector combination which enables the receiving directional diagram of each active antenna to be orthogonal so as to form at least one set of orthogonal receiving combinations.

The orthogonal receiving combination enables the receiving directional diagram of each active antenna to be orthogonal, and thus the following formula is satisfied:

$$\frac{\left|\int_0^{2\pi} g_1^H a_R(\theta)(g_2^H a_R(\theta))^H d\theta\right|}{\sqrt{\int_0^{2\pi} g_1^H a_R(\theta)(g_1^H a_R(\theta))^H d\theta} \sqrt{\int_0^{2\pi} g_2^H a_R(\theta)(g_2^H a_R(\theta))^H d\theta}} = 0,$$

where, $a_R(\theta)$, $g_1$ and $g_2$ are defined as above, which will not be repeated herein.

The signal receiving device traverses the receiving direction vector combinations acquired, multiple sets of receiving direction vector combinations acquired from the previous step are substituted to the formula respectively, if the formula is satisfied, then the receiving direction vector combinations are orthogonal receiving combinations, thereby acquiring at least one set of orthogonal receiving combinations.

S804: determining, by the signal receiving device, whether the signal transmitting device uses a slow fading mode or a fast fading mode according to the mode command If the signal transmitting device uses the slow fading mode, the method proceeds to S805; if the signal transmitting device uses the fast fading mode, the method proceeds to S806.

S805: selecting, by the signal receiving device, from the at least one set of orthogonal receiving combinations a set of orthogonal receiving combination which maximizes channel capacity.

Figure 9:
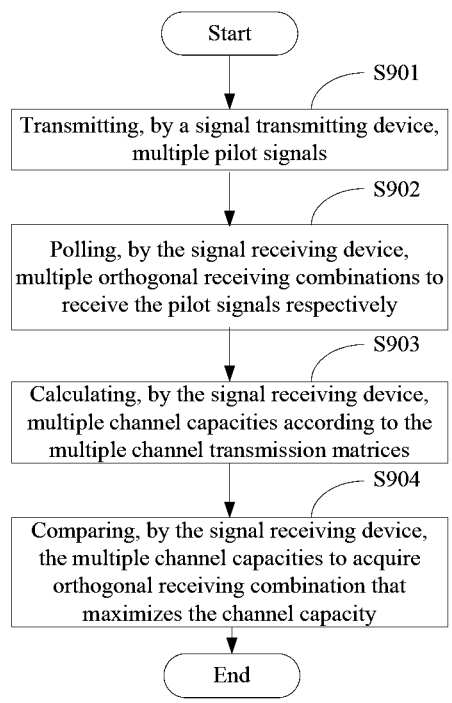
FIG. 9 is a flow chart of a step of selecting a set of orthogonal receiving combinations which maximizes channel capacity as shown in FIG. 8.

Reference may also be made to FIG. 9 which is a flow chart of a step of selecting a set of orthogonal receiving combination which maximizes the channel capacity as shown in FIG. 8. The step of selecting a set of orthogonal receiving combination which maximizes channel capacity includes the following steps:

S901: transmitting, by a signal transmitting device, multiple pilot signals.

The signal transmitting device transmits multiple pilot signals to the signal receiving device, where the multiple pilot signals may be different pilot signals, and may also be same pilot signals.

S902: polling, by the signal receiving device, multiple orthogonal receiving combinations to receive the pilot signals respectively.

Since the signal receiving device has different channel transmission matrices in different orthogonal receiving combinations, thus, the signal receiving device, after receiving multiple pilot signals, estimates a channel transmission matrix corresponding to each set of orthogonal receiving combination according to the pilot signals respectively. The signal receiving device is prestored with pilot signals, hence, the signal receiving device, after receiving the pilot signals transmitted by the signal transmitting device, compares the pilot signals received with the pilot signals stored locally to obtain the channel transmission matrix.

S903: calculating, by the signal receiving device, multiple channel capacities according to the multiple channel transmission matrices.

After obtaining the channel transmission matrix corresponding to each set of orthogonal receiving combination through calculation, the signal receiving device obtains channel capacity corresponding to each set of orthogonal receiving combination through calculation according to the following formula.

$$C_m = \log_2 \det\left(I_2 + \frac{P_{total}}{2\sigma^2} \hat{H}_m \hat{H}_m^H\right)$$

n∈M, M is total amount of the orthogonal receiving combinations, m represents one set of the orthogonal receiving combination therein, $C_m$ is a channel capacity corresponding to the $m^{th}$ orthogonal receiving combination, $I_2$ is a second-order unit matrix, $P_{total}$ is total transmitting power, $\sigma^2$ is noise variance, and $\hat{H}_m$ is a channel transmission matrix corresponding to the $m^{th}$ orthogonal receiving combination.

S904: comparing, by the signal receiving device, the multiple channel capacities to acquire orthogonal receiving combination that maximizes the channel capacity.

After obtaining the channel capacity corresponding to each set of orthogonal receiving combination through calculation, the signal receiving device compares the channel capacity corresponding to each set of orthogonal receiving combination to acquire orthogonal receiving combination that maximize the channel capacity.

In summary, the signal receiving device selects from at least one set of orthogonal receiving combinations one set of orthogonal receiving combination that maximizes the channel capacity when the signal transmitting device uses a slow fading mode, and the method proceeds to S807.

S806: dividing, by the signal receiving device, time frequency resources of the received data into resource blocks which have the same number as that of orthogonal receiving combinations, where each resource block selects a set of orthogonal receiving combination correspondingly.

When the signal transmitting device uses the fast fading mode, time frequency resources of the received data are divided into resource blocks which have the same number as that of orthogonal receiving combinations, where each resource block selects a set of orthogonal receiving combination correspondingly, and thus results of selecting the orthogonal receiving combinations quickly are achieved, then, the method proceeds to S807.

S807: adjusting, by the signal receiving device, reactance of the controllable loads via the control circuit according to the orthogonal receiving combination to receive data.

When the signal transmitting device uses the slow fading mode, the signal receiving device locally selects a set of orthogonal receiving combination that maximizes channel capacity, then, adjusts reactance of the controllable loads via the control circuit to acquire the set of orthogonal receiving combination.

When the signal transmitting device uses the fast fading mode, the signal receiving device selects a first set of orthogonal receiving combination in a first block of the time frequency resources, then, the control circuit adjusts reactance of the controllable loads to acquire the first set of orthogonal receiving combination. The next time frequency resource selects next set of orthogonal receiving combination till the last set of orthogonal receiving combination is selected, which then reselects a first set of orthogonal receiving combination until all data are received.

S808: traversing, by the signal transmitting device, different reactance of controllable loads within a predefined range to acquire multiple sets of receiving direction vector combinations.

In this embodiment, reactance of the controllable loads may be predefined in an interval of [−100j,100j], and multiple sets of receiving direction vector combinations may be acquired by traversing different reactance of the controllable loads.

S809: determining, by the signal receiving device, whether relevance of each set of receiving direction vector combination is greater than a threshold value.

The signal receiving device, after acquiring the multiple sets of receiving direction vector combinations, determines whether relevance of each set of receiving direction vector combination is greater than a threshold value according to the following formula. A range of the threshold value is [0,1], the threshold value is larger, and the relevance is higher. In this embodiment, the threshold value may be set to 0.6.

$$\rho_{g_1,g_2} = \frac{|g_1^H g_2|}{\sqrt{g_1^H g_1} \sqrt{g_2^H g_2}} > \varepsilon$$

$\rho_{g_1,g_2}$ is relevance of each set of receiving direction vector combination, $\varepsilon$ is a threshold value, $g_1$ and $g_2$ are defined as above, which will not be repeated herein.

If the relevance of receiving direction vector combination is greater than the threshold value, the method proceeds to S810, otherwise, no processing is performed.

S810: storing, by the signal receiving device, the set of receiving direction vector combination to form at least one set of relevant receiving combinations.

The signal receiving device locally stores a receiving direction vector combination whose relevance is greater than the threshold value to be regarded as a relevant receiving combination.

S811: determining, by the signal receiving device, whether the signal transmitting device uses a slow fading mode or a fast fading mode according to the mode command If the signal transmitting device uses the slow fading mode, the method proceeds to S812; if the signal transmitting device uses the fast fading mode, the method proceeds to S813.

S812: selecting, by the signal receiving device, from the at least one set of relevant receiving combinations a set of relevant receiving combination which maximizes a first way beam gain.

Figure 10:
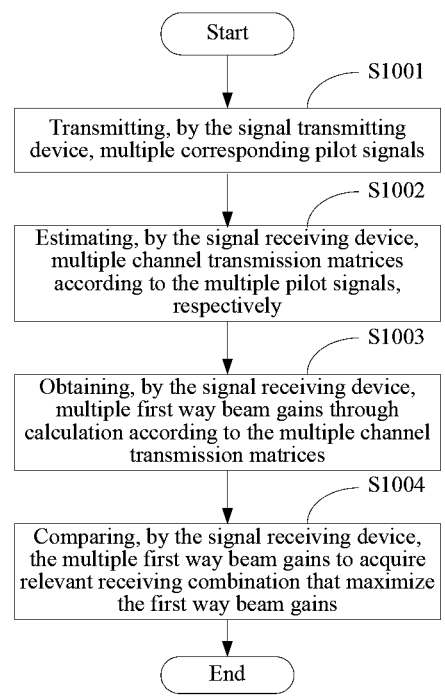
FIG. 10 is a flow chart of a step of selecting a set of relevant receiving combinations which maximizes a first way beam gain as shown in FIG. 8.

Reference may also be made to FIG. 10 which is a flow chart of a step of selecting a set of relevant receiving combination which maximizes a first way beam gain as shown in FIG. 8. The step of selecting a set of relevant receiving combination which maximizes a first way beam gain includes the following steps:

S1001: transmitting, by the signal transmitting device, multiple corresponding pilot signals.

The signal transmitting device transmits multiple pilot signals to the signal receiving device, where the multiple pilot signals may be different pilot signals, and may also be same pilot signals.

S1002: estimating, by the signal receiving device, multiple channel transmission matrices according to the multiple pilot signals, respectively.

Since the signal receiving device has different channel transmission matrices in different relevant receiving combinations, thus, the signal receiving device, after receiving multiple pilot signals, estimates a channel transmission matrix corresponding to each set of relevant receiving combination according to the pilot signals respectively. The signal receiving device is prestored with pilot signals, hence, the signal receiving device, after receiving the pilot signals transmitted by the signal transmitting device, compares the pilot signals received with the pilot signals stored locally to obtain the channel transmission matrices.

S1003: obtaining, by the signal receiving device, multiple first way beam gains through calculation according to the multiple channel transmission matrices.

After the signal receiving device obtains the channel transmission matrix corresponding to each set of relevant receiving combinations through calculation, a singular value decomposition may be performed to the channel transmission matrix so as to acquire the first way beam gain corresponding to each set of relevant receiving combination. A formula of the singular value decomposition is as follows:

$$[g_{1,n}\ g_{2,n}]^H H = [U_{1,n}\ U_{2,n}]\begin{bmatrix}\lambda_1([g_{1,n}\ g_{2,n}]^H H) & 0 \\ 0 & \lambda_2([g_{1,n}\ g_{2,n}]^H H)\end{bmatrix}[V_{1,n}\ V_{2,n}]^H$$

n∈N, N is total amount of the relevant receiving combinations, n represents one set of the relevant receiving combination, $[g_{1,n}\ g_{2,n}]^H H$ is a channel transmission matrix corresponding to the $n^{th}$ relevant receiving combination, $\lambda_1([g_{1,n}\ g_{2,n}]^H H$ is a first way beam gain, $\lambda_2([g_{1,n}\ g_{2,n}]^H H$ is a second way beam gain, and $$\lambda_1([g_{1,n}g_{2,n}]^H H) \geq \lambda_2([g_{1,n}g_{2,n}]^H H) \geq 0,$$

$U_{1,n}$, $U_{2,n}$ are left singular vectors corresponding to the first way beam gain and the second way beam gain respectively, whereas $V_{1,n}$, $V_{2,n}$ are right singular vectors corresponding to the first way beam gain and the second way beam gain respectively.

S1004: comparing, by the signal receiving device, the multiple first way beam gains to acquire relevant receiving combination that maximize the first way beam gains.

After obtaining the first way beam gain corresponding to each set of relevant receiving combination through calculation, the signal receiving device compares the first way beam gain corresponding to each set of relevant receiving combination to acquire relevant receiving combination that maximize the first way beam gain.

In summary, when the signal transmitting device uses a slow fading mode, a set of relevant receiving combination that maximizes a first way beam gain is selected from at least one set of relevant receiving combinations, and the method proceeds to S814.

S813: dividing, by the signal receiving device, time frequency resources of received data into resource blocks which have the same number as that of relevant receiving combinations, where each resource block selects a set of relevant receiving combination correspondingly.

When the signal transmitting device uses the fast fading mode, the signal receiving device divides time frequency resources of the received data into resource blocks which have the same number as that of relevant receiving combinations.

Figure 11:
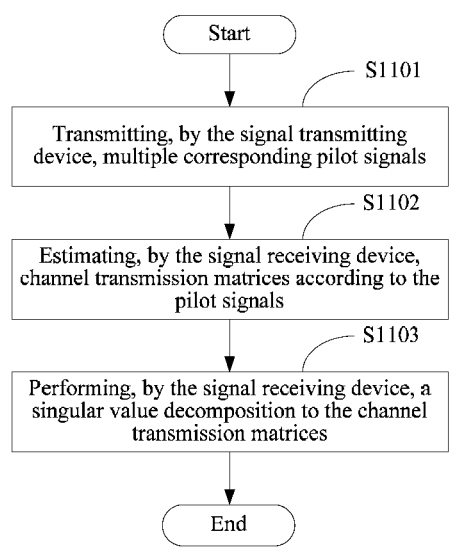
FIG. 11 is a flow chart of a step where each resource block selects a set of relevant receiving combinations correspondingly as shown in FIG. 8.

Reference may be made to FIG. 11 which is a flow chart of a step where each resource block selects a set of relevant receiving combination correspondingly as shown in FIG. 8. The step where each resource block selects a set of relevant receiving combination correspondingly includes the following steps:

S1101: transmitting, by the signal transmitting device, multiple corresponding pilot signals.

The signal transmitting device transmits multiple pilot signals to the signal receiving device, where the multiple pilot signals may be different pilot signals, and may also be same pilot signals.

S1102: estimating, by the signal receiving device, channel transmission matrices according to the pilot signals.

Since the signal receiving device must adjust receiving directional diagrams of the active antennas according to conjugation of a left singular vector, thus, the signal receiving device, after receiving the pilot signals, must estimate channel transmission matrices according to the pilot signals, so that a singular value decomposition is performed to the channel transmission matrices, thereby obtaining the conjugation of the left singular vector. The signal receiving device is prestored with pilot signals, hence, the signal receiving device, after receiving the pilot signals transmitted by the signal transmitting device, compares the pilot signals received with the pilot signals stored locally to obtain the channel transmission matrices.

S1103: performing, by the signal receiving device, a singular value decomposition to the channel transmission matrices. A process of the singular value decomposition to the channel transmission matrices is similar to a process of the singular value decomposition in S503, which will not be repeated herein. Then, a conjugate operation is performed to the left singular vector obtained so as to obtain the conjugation of the left singular vector.

S814: adjusting, by the signal receiving device, reactance of the controllable loads via the control circuit according to the relevant receiving combination, and adjusting receiving directional diagrams of the active antennas according to a receiving beamforming vector, where the receiving beamforming vector is conjugate of a left singular vector corresponding to the first way beam gain after a singular value decomposition is performed to a channel transmission matrix.

When the transmitting device uses the slow fading mode, the signal receiving device selects a set of relevant transmitting combination that maximizes a first way beam gain, then, adjusts reactance of the controllable loads via the control circuit to acquire the set of relevant transmitting combination, and adjusts receiving directional diagrams of the active antennas via a receiving link according to the conjugation of the left singular vector.

When the transmitting device uses the fast fading mode, the signal receiving device selects a first set of relevant receiving combination in a first block of the time frequency resources, then, the control circuit adjusts reactance of the controllable loads to acquire the first set of relevant receiving combination, and adjusts the receiving directional diagrams of the active antennas via the receiving link according to the conjugation of the left singular vector. The next time frequency resource selects next set of relevant receiving combination till the last set of relevant transmitting combination is selected, which then reselects a first set of relevant receiving combination until all data are received.

Figure 12:
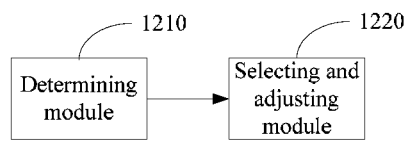
FIG. 12 is a schematic structural diagram of a signal transmitting device according to an embodiment of the present application.

Reference may be made to FIG. 12 which is a schematic structural diagram of a signal transmitting device according to an embodiment of the present application. The signal transmitting device in this embodiment includes: at least two active antennas, where each active antenna is surrounded by at least two different parasitic antennas, respective parasitic antennas are respectively coupled to controllable loads, and the controllable loads are respectively coupled to a control circuit, the device further includes: a determining module 1210 and a selecting and adjusting module 1220 coupled to each other.

The determining module 1210 is configured to determine whether a downlink channel is in a good state according to channel change predictions, channel quality report feedback or uplink data transmission conditions, and transmit a first determining result to the selecting and adjusting module 1220.

The selecting and adjusting module 1220 is configured to receive the first determining result, and when the channel is in the good state, select an orthogonal transmitting combination, and adjust reactance of the controllable loads via the control circuit according to the orthogonal transmitting combination to transmit data, and bear the data of the signal transmitting device in a mode command by using a multiplexing mode to transmit data to a signal receiving device; when the channel is in a not good state, select a relevant transmitting combination, and adjust reactance of the controllable loads via the control circuit according to the relevant transmitting combination, and adjust transmitting directional diagrams of the active antennas according to a transmitting beamforming vector to transmit data, and bear the data of the signal transmitting device in a mode command by using a beamforming mode to transmit it to the signal receiving device. For instance, the downlink channel has a lower bit error ratio in the good state than in the not good state, thus, when the downlink channel is in the good state, the selecting and adjusting module 1220 selects the orthogonal transmitting combination to reduce relevance of the channel, thereby realizing both increase of channel capacity and transmission of multi-stream data. The selecting and adjusting module 1220, after selecting a proper orthogonal transmitting combination, adjusts reactance of the controllable loads via the control circuit to acquire the orthogonal transmitting combination as desired to transmit data, and bears the data of the signal transmitting device in a mode command by using a multiplexing mode to transmit data to the signal receiving device. The orthogonal transmitting combination is a transmitting direction vector combination that enables transmitting directional diagram of each active antenna to be orthogonal. The downlink channel has a higher bit error ratio in the not good state than in the good state, thus, when the downlink channel is in the not good state, the selecting and adjusting module 1220 selects the relevant transmitting combination to improve relevance of the channel, and thus mono-stream data may be transmitted by utilizing multiple active antennas and parasitic antennas affiliated therewith so as to reduce the bit error ratio. The selecting and adjusting module 1220, after selecting a proper relevant transmitting combination, adjusts reactance of the controllable loads via the control circuit to acquire the relevant transmitting combination as desired and adjusts a transmitting beamforming vector via a transmitting link so as to adjust transmitting directional diagrams of the active antennas to transmit data, and bears the data of the signal transmitting device in a mode command by using a beamforming mode to transmit it to the signal receiving device.

Figure 13:
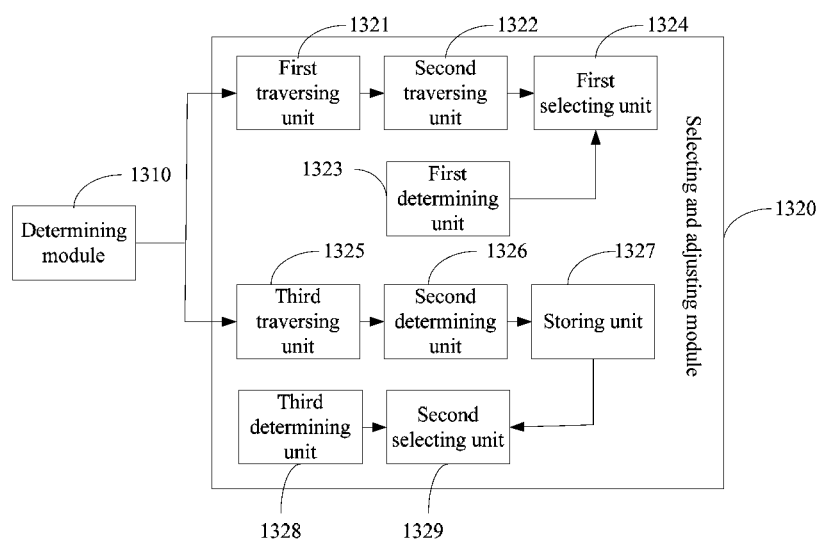
FIG. 13 is a schematic structural diagram of a signal transmitting device according to another embodiment of the present application.

Reference may be made to FIG. 13 which is a schematic structural diagram of a signal transmitting device according to another embodiment of the present application. The signal transmitting device in this embodiment includes at least two active antennas, where each active antenna is surrounded by at least two different parasitic antennas, respective parasitic antennas are respectively coupled to controllable loads, and the controllable loads are respectively coupled to a control circuit, the device further includes: a determining module 1310 and a selecting and adjusting module 1320 coupled to each other. The selecting and adjusting module 1320 includes a first traversing unit 1321, a second traversing unit 1322, a first determining unit 1323, a first selecting unit 1324, a third traversing unit 1325, a second determining unit 1326, a storing unit 1327, a third determining unit 1328 and a second selecting unit 1329 which are coupled in sequence.

The determining module 1310 and the selecting and adjusting module 1320 are the same as the determining module 1210 and the selecting and adjusting module 1220 in the previous embodiment, which will not be repeated herein. The selecting and adjusting module 1320 also specifically includes:

The first traversing unit 1321 is configured to traverse different reactance of controllable loads within a predefined range to acquire multiple sets of transmitting direction vector combinations, and transmit the multiple sets of transmitting direction vector combinations to the second traversing unit 1322. For example, reactance of the controllable loads may be predefined in an interval of [−100j,100j], and multiple sets of transmitting direction vector combinations may be acquired by traversing different reactance of the controllable loads.

The second traversing unit 1322 is configured to traverse the transmitting direction vector combinations acquired to acquire at least one set of transmitting direction vector combination which enables the transmitting directional diagram of each active antenna to be orthogonal so as to form at least one set of orthogonal transmitting combination, and transmit the at least one set of orthogonal transmitting combination to the first selecting unit 1324. The orthogonal transmitting combination enables the transmitting directional diagram of each active antenna to be orthogonal, and thus it satisfies the following formula:

$$\frac{\left|\int_0^{2\pi} a_T(\theta)g_1(a_T(\theta)g_2)^H \, d\theta\right|}{\sqrt{\int_0^{2\pi} a_T(\theta)g_1(a_T(\theta)g_1)^H \, d\theta} \sqrt{\int_0^{2\pi} a_T(\theta)g_2(a_T(\theta)g_2)^H \, d\theta}} = 0,$$

where, $a_T(\theta)$, $g_1$ and $g_2$ are defined as above, which will not be repeated herein.

For instance, the signal transmitting device traverses the transmitting direction vector combinations acquired, multiple sets of transmitting direction vector combinations acquired are substituted to the formula respectively, if the formula is satisfied, then the transmitting direction vector combinations are orthogonal transmitting combinations, thereby acquiring at least one set of orthogonal transmitting combination.

The first determining unit 1323 is configured to determine whether the downlink channel is in a slow fading condition or in a fast fading condition according to the channel change predictions, the channel quality report feedback or the uplink data transmission conditions, and transmit a second determining result to the first selecting unit 1324.

The first selecting unit 1324 is configured to receive the at least one set of orthogonal transmitting combinations and the second determining result, and when the channel is in the slow fading condition, select from the at least one set of orthogonal transmitting combinations a set of orthogonal transmitting combination which maximizes channel capacity, and bear the data of the signal transmitting device in a mode command by using a slow fading mode to transmit it to the signal receiving device; when the channel is in the fast fading condition, divide time frequency resources of the transmitted data into resource blocks which have the same number as that of orthogonal transmitting combinations, where each resource block selects a set of orthogonal transmitting combination correspondingly, and bear the data of the signal transmitting device in a mode command by using a fast fading mode to transmit it to the signal receiving device. For instance, when the channel is in the slow fading condition, the first selecting unit 1324, after controlling the array antenna to transmit pilot signals, acquires the orthogonal transmitting combinations that maximize channel capacity and are sought out by the receiving device according to the pilot signals. A specific process is as shown in FIG. 4, which will not be repeated herein. When the channel is in the fast fading condition, time frequency resources of the transmitted data are divided into resource blocks which have the same number as that of orthogonal transmitting combinations, where each resource block selects a set of orthogonal transmitting combination correspondingly, and thus results of selecting the orthogonal transmitting combinations quickly are achieved.

The third traversing unit 1325 is configured to traverse different reactance of the controllable loads within a predefined range to acquire multiple sets of transmitting direction vector combinations, and transmit the multiple sets of transmitting direction vector combinations to the second determining unit 1326. For example, reactance of the controllable loads may be predefined in an interval of [−100j,100j], and multiple sets of transmitting direction vector combinations may be acquired by traversing different reactance of the controllable loads.

The second determining unit 1326 is configured to receive the multiple sets of transmitting direction vector combinations, determine whether relevance of each set of transmitting direction vector combination is greater than a threshold value, and transmit a third determining result to the storing unit 1327. For instance, the signal transmitting device, after acquiring the multiple sets of transmitting direction vector combinations, determines whether relevance of each set of transmitting direction vector combination is greater than a threshold value according to the following formula. A range of the threshold value is [0,1], the threshold value is larger, and the relevance is higher. In this embodiment, the threshold value may be set to 0.6.

$$\rho_{g_1,g_2} = \frac{|g_1^H g_2|}{\sqrt{g_1^H g_1} \sqrt{g_2^H g_2}} > \varepsilon$$

$\rho_{g_1,g_2}$ is relevance of each set of transmitting direction vector combination, $\varepsilon$ is a threshold value, $g_1$ and $g_2$ are defined as above, which will not be repeated herein.

The storing unit 1327 is configured to receive the third determining result, when the relevance of the transmitting direction vector combination is greater than the threshold value, store the set of transmitting direction vector combination to form at least one set of relevant transmitting combination, and transmit the at least one set of relevant transmitting combination to the second selecting unit 1329. For instance, the signal transmitting device locally stores a transmitting direction vector combination whose relevance is greater than the threshold value to be regarded as a relevant transmitting combination.

The third determining unit 1328 is configured to determine whether the downlink channel is in a slow fading condition or in a fast fading condition according to the channel change predictions, the channel quality report feedback or the uplink data transmission conditions, and transmit a fourth determining result to the second selecting unit 1329.

The second selecting unit 1329 is configured to receive the at least one set of relevant transmitting combinations and the fourth determining result, and when the channel is in the slow fading condition, select from the at least one set of relevant transmitting combinations a set of relevant transmitting combination which maximizes a first way beam gain, and bear the data of the signal transmitting device in a mode command by using a slow fading mode to transmit it to the signal receiving device; when the channel is in the fast fading condition, divide time frequency resources of the transmitted data into resource blocks which have the same number as that of relevant transmitting combinations, where each resource block selects a set of relevant transmitting combination correspondingly, and bear the data of the signal transmitting device in a mode command by using a fast fading mode to transmit it to the signal receiving device. For instance, when the channel is in the slow fading condition, the second selecting unit 1329 controls the array antenna to transmit pilot signals and acquires an orthogonal transmitting combination that maximizes a first way beam gain and is obtained by the receiving device through calculation according to the pilot signals. A specific process is as shown in FIG. 5, which will not be repeated herein. When the channel is in the fast fading condition, the second selecting unit 1329 divides time frequency resources of the transmitted data into resource blocks which have the same number as that of relevant transmitting combinations, then transmits the pilot signals to the signal receiving device, and acquires a right singular vector corresponding to each relevant transmitting combination according to the pilot signals. A specific process is as shown in FIG. 6, which will not be repeated herein. The transmitting beamforming vector is a right singular vector corresponding to the first way beam gain after a singular value decomposition is performed to a channel transmission matrix.

Figure 14:
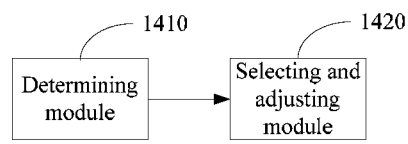
FIG. 14 is a schematic structural diagram of a signal receiving device according to an embodiment of the present application.

Reference may be made to FIG. 14 which is a schematic structural diagram of a signal receiving device according to an embodiment of the present application. The signal receiving device in this embodiment includes: at least two active antennas, where each active antenna is surrounded by at least two different parasitic antennas, respective parasitic antennas are respectively coupled to controllable loads, and the controllable loads are respectively coupled to a control circuit, the device further includes: a determining module 1410 and a selecting and adjusting module 1420 coupled to each other.

The determining module 1410 is configured to receive a mode command, and determine whether a signal transmitting device uses a multiplexing mode or a beamforming mode according to the mode command, and transmit a first determining result to the selecting and adjusting module 1420.

The selecting and adjusting module 1420 is configured to receive the first determining result, and when the signal transmitting device uses the multiplexing mode, select an orthogonal receiving combination, and adjust reactance of the controllable loads via the control circuit according to the orthogonal receiving combination to receive a signal; when the signal transmitting device uses the beamforming mode, select a relevant receiving combination, and adjusting reactance of the controllable loads via the control circuit according to the relevant receiving combination, and adjust receiving directional diagrams of the active antennas according to a receiving beamforming vector to receive a signal. For instance, if the signal transmitting device uses the multiplexing mode, the selecting and adjusting module 1420 also selects the orthogonal transmitting combination to reduce relevance of the channel. The selecting and adjusting module 1420, after selecting a proper orthogonal receiving combination, adjusts reactance of the controllable loads via the control circuit to acquire the orthogonal receiving combination as desired. The orthogonal receiving combination is a receiving direction vector combination that enables receiving directional diagram of each active antenna to be orthogonal. If the signal transmitting device uses the beamforming mode, the signal receiving device also selects the relevant transmitting combination to improve relevance of the channel. The selecting and adjusting module 1420, after selecting a proper relevant receiving combination, adjusts reactance of the controllable loads via the control circuit to acquire the relevant receiving combination as desired, and adjusts a receiving beamforming vector via a receiving link, thereby adjusting receiving directional diagrams of the active antennas to receive data.

Figure 15:
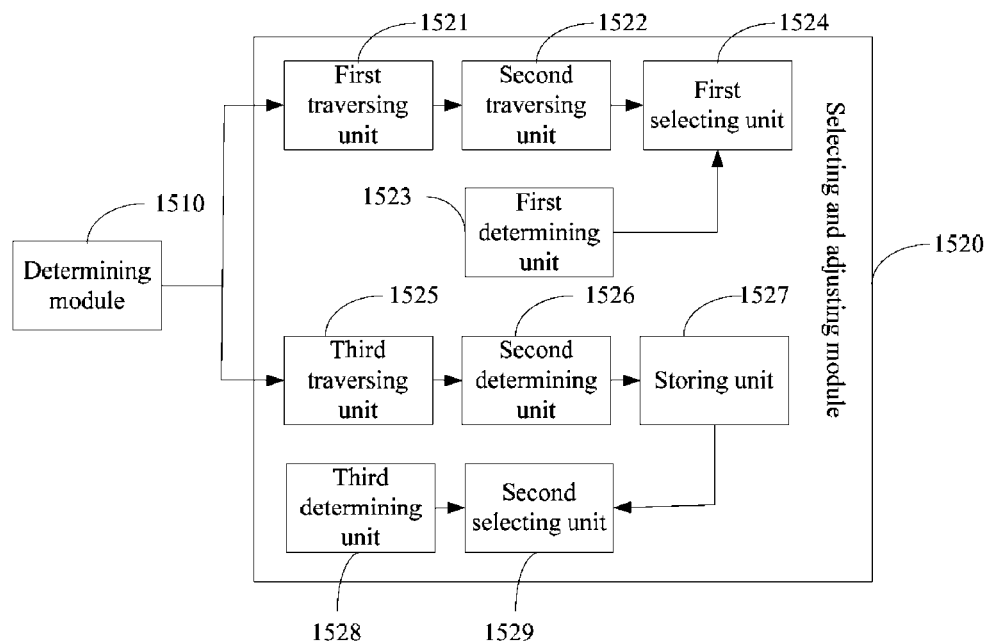
FIG. 15 is a schematic structural diagram of a signal receiving device according to another embodiment of the present application.

Reference may be made to FIG. 15 which is a schematic structural diagram of a signal receiving device according to another embodiment of the present application. The signal receiving device in this embodiment includes at least two active antennas, where each active antenna is surrounded by at least two different parasitic antennas, respective parasitic antennas are respectively coupled to controllable loads, and the controllable loads are respectively coupled to a control circuit, the device further includes: a determining module 1510 and a selecting and adjusting module 1520 coupled to each other. The selecting and adjusting module 1520 includes a first traversing unit 1521, a second traversing unit 1522, a first determining unit 1523, a first selecting unit 1524, a third traversing unit 1525, a second determining unit 1526, a storing unit 1527, a third determining unit 1528 and a second selecting unit 1529 which are coupled in sequence.

The determining module 1510 and the selecting and adjusting module 1520 are the same as the determining module 1410 and the selecting and adjusting module 1420 in the previous embodiment, which will not be repeated herein. The selecting and adjusting module 1520 also specifically includes:

The first traversing unit 1521 is configured to traverse different reactance of the controllable loads within a predefined range to acquire multiple sets of receiving direction vector combinations, and transmit the multiple sets of receiving direction vector combinations to the second traversing unit 1522. For example, reactance of the controllable loads may be predefined in an interval of [−100j,100j], and multiple sets of receiving direction vector combinations may be acquired by traversing different reactance of the controllable loads.

The second traversing unit 1522 is configured to traverse the receiving direction vector combinations acquired to acquire at least one set of receiving direction vector combination which enables the receiving directional diagram of each active antenna to be orthogonal so as to form at least one set of orthogonal receiving combinations, and transmit the at least one set of orthogonal receiving combinations to the first selecting unit 1524. The orthogonal receiving combination enables the receiving directional diagram of each active antenna to be orthogonal, and thus the following formula is satisfied:

$$\frac{\left|\int_0^{2\pi} g_1^H a_R(\theta)(g_2^H a_R(\theta))^H d\theta\right|}{\sqrt{\int_0^{2\pi} g_1^H a_R(\theta)(g_1^H a_R(\theta))^H d\theta} \sqrt{\int_0^{2\pi} g_2^H a_R(\theta)(g_2^H a_R(\theta))^H d\theta}} = 0,$$

where, $a_R(\theta)$, $g_1$ and $g_2$ are defined as above, which will not be repeated herein.

For instance, the signal receiving device traverses the receiving direction vector combinations acquired, multiple sets of receiving direction vector combinations acquired from the previous step are substituted to the formula respectively, if the formula is satisfied, then the receiving direction vector combinations are orthogonal receiving combinations, thereby acquiring at least one set of orthogonal receiving combinations.

The first determining unit 1523 is configured to determine whether the signal transmitting device uses a slow fading mode or a fast fading mode according to the mode command, and transmit a second determining result to the first selecting unit 1524.

The first selecting unit 1524 is configured to receive the at least one set of orthogonal receiving combinations and the second determining result, and when the signal transmitting device uses the slow fading mode, select from the at least one set of orthogonal receiving combinations a set of orthogonal receiving combination which maximizes channel capacity; when the signal transmitting device uses the fast fading mode, divide time frequency resources of the received signal into resource blocks which have the same number as that of orthogonal receiving combinations, where each resource block selects a set of orthogonal receiving combination correspondingly. For instance, when the channel is in the slow fading condition, the first selecting unit 1524 receives pilot signals and acquires the orthogonal receiving combinations that maximize channel capacity according to the pilot signals. A specific process is as shown in FIG. 9, which will not be repeated herein. When the channel is in the fast fading condition, time frequency resources of the received data are divided into resource blocks which have the same number as that of orthogonal receiving combinations, where each resource block selects a set of orthogonal receiving combination correspondingly, and thus results of selecting the orthogonal receiving combinations quickly are achieved.

The third traversing unit 1525 is configured to traverse different reactance of the controllable loads within a predefined range to acquire multiple sets of receiving direction vector combinations, and transmit the multiple sets of receiving direction vector combinations to the second determining unit 1526. For example, reactance of the controllable loads may be predefined in an interval of [−100j,100j], and multiple sets of receiving direction vector combinations may be acquired by traversing different reactance of the controllable loads.

The second determining unit 1526 is configured to receive the multiple sets of receiving direction vector combinations, determine whether relevance of each set of receiving direction vector combination is greater than a threshold value, and transmit a third determining result to the storing unit 1527. For instance, the signal receiving device, after acquiring the multiple sets of receiving direction vector combinations, determines whether relevance of each set of receiving direction vector combination is greater than a threshold value according to the following formula. A range of the threshold value is [0,1], the threshold value is larger, and the relevance is higher. In this embodiment, the threshold value may be set to 0.6.

$$\rho_{g_1 \cdot g_2} = \frac{|g_1^H g_2|}{\sqrt{g_1^H g_1} \sqrt{g_2^H g_2}} > \varepsilon$$

$\rho_{g_1 \cdot g_2}$ is relevance of each set of receiving direction vector combination, $\varepsilon$ is a threshold value, $g_1$ and $g_2$ are defined as above, which will not be repeated herein.

The storing unit 1527 is configured to receive the third determining result, and when the relevance of the receiving direction vector combination is greater than the threshold value, store the set of receiving direction vector combination to form at least one set of relevant receiving combinations, and transmit the at least one set of relevant receiving combinations to the second selecting unit 1529. For instance, the signal receiving device locally stores a receiving direction vector combination whose relevance is greater than the threshold value to be regarded as a relevant receiving combination.

The third determining unit 1528 is configured to determine whether the signal transmitting device uses a slow fading mode or a fast fading mode according to the mode command, and transmit a fourth determining result to the second selecting unit 1529.

The second selecting unit 1529 is configured to receive the at least one set of relevant receiving combinations and the fourth determining result, and when the signal transmitting device uses the slow fading mode, select from the at least one set of relevant receiving combinations a set of relevant receiving combination which maximizes a first way beam gain; when the signal transmitting device uses the fast fading mode, divide time frequency resources of the received signal into resource blocks which have the same number as that of relevant receiving combinations, where each resource block selects a set of relevant receiving combination correspondingly. For instance, when the channel is in the slow fading condition, the second selecting unit 1529 receives pilot signals and acquires a relevant receiving combination that maximizes a first way beam gain through calculation according to the pilot signals. A specific process is as shown in FIG. 10, which will not be repeated herein. When the channel is in the fast fading condition, the second selecting unit 1529 divides time frequency resources of the received data into resource blocks which have the same number as that of relevant receiving combinations, then receives the pilot signals, and acquires conjugate of a left singular vector corresponding to each relevant receiving combination according to the pilot signals. A specific process is as shown in FIG. 10, which will not be repeated herein. The receiving beamforming vector is conjugation of a left singular vector corresponding to the first way beam gain after a singular value decomposition is performed to a channel transmission matrix.

Figure 16:
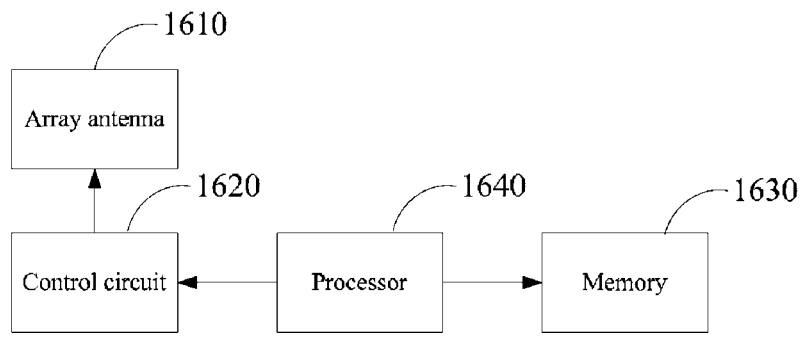
FIG. 16 is a schematic structural diagram of a signal transmitting device according to still another embodiment of the present application.

Reference may be made to FIG. 16 which is a schematic structural diagram of a signal transmitting device according to still another embodiment of the present application. The signal transmitting device in this embodiment includes an array antenna 1610, a control circuit 1620, a memory 1630 and a processor 1640. The array antenna 1610 includes at least two active antennas, where each active antenna is surrounded by at least two different parasitic antennas, respective parasitic antennas are respectively coupled to controllable loads, and the controllable loads are respectively coupled to the control circuit 1620. The processor 1640 is respectively coupled to the control circuit 1620 and the memory 1630.

The array antenna 1610 is configured to adjust transmitting directional diagrams by adjusting reactance of the parasitic antennas and by adjusting a transmitting beamforming vector via a transmitting link;

The control circuit 1620 is configured to adjust reactance of the parasitic antennas;

The memory 1630 is configured to store programs and data;

The processor 1640 is configured to determine whether a downlink channel is in a good state according to channel change predictions, channel quality report feedback or uplink data transmission conditions;

if the channel is in the good state, select an orthogonal transmitting combination, and adjust reactance of the controllable loads in the array antenna 1610 via the control circuit 1620 according to the orthogonal transmitting combination to transmit data, and bear the data of the signal transmitting device in a mode command by using a multiplexing mode to transmit data to a receive signal device; if the channel is not in the good state, select a relevant transmitting combination, and adjust reactance of the controllable loads in the array antenna 1610 via the control circuit 1620 according to the relevant transmitting combination, and adjust transmitting directional diagrams of the active antennas according to a transmitting beamforming vector to transmit data, and bear the data of the signal transmitting device in a mode command by using a beamforming mode to transmit it to a signal receiving device. The transmitting beamforming vector is a right singular vector corresponding to the first way beam gain after a singular value decomposition is performed to a channel transmission matrix.

When selecting an orthogonal transmitting combination, the processor 1640 is further configured to traverse different reactance of the controllable loads within a predefined range to acquire multiple sets of transmitting direction vector combinations; traverse the transmitting direction vector combinations acquired to acquire at least one set of transmitting direction vector combination which enables the transmitting directional diagrams of each active antenna to be orthogonal so as to form at least one set of orthogonal transmitting combinations; determine whether the downlink channel is in a slow fading or fast fading condition according to the channel change predictions, the channel quality report feedback or the uplink data transmission conditions; if the channel is in the slow fading condition, select from the at least one set of orthogonal transmitting combinations a set of orthogonal transmitting combination which maximizes channel capacity, and bear the data of the signal transmitting device in a mode command by using a slow fading mode to transmit it to the signal receiving device; if the channel is in the fast fading condition, divide time frequency resources of the transmitted data into resource blocks which have the same number as that of orthogonal transmitting combinations, where each resource block selects a set of orthogonal transmitting combination correspondingly, and bear the data of the signal transmitting device in a mode command by using a fast fading mode to transmit it to the signal receiving device.

When selecting an orthogonal transmitting combination, the processor 1640 is further configured to traverse different reactance of the controllable loads within a predefined range to acquire multiple sets of transmitting direction vector combinations; determine whether relevance of each set of transmitting direction vector combination is greater than a threshold value; if the relevance of the transmitting direction vector combination is greater than the threshold value, then store the set of transmitting direction vector combination to form at least one set of relevant transmitting combinations; determine whether the downlink channel is in a slow fading or fast fading condition according to the channel change predictions, the channel quality report feedback or the uplink data transmission conditions; if the channel is in the slow fading condition, select from the at least one set of relevant transmitting combinations a set of relevant transmitting combination which maximizes a first way beam gain, and bear the data of the signal transmitting device in a mode command by using a slow fading mode to transmit it to the signal receiving device; if the channel is in the fast fading condition, divide time frequency resources of the transmitted data into resource blocks which have the same number as that of relevant transmitting combinations, where each resource block selects a set of relevant transmitting combination correspondingly, and bear the data of the signal transmitting device in a mode command by using a fast fading mode to transmit it to the signal receiving device.

Figure 17:
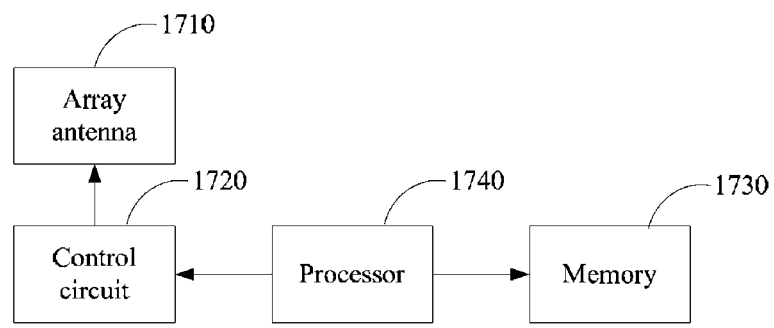
FIG. 17 is a schematic structural diagram of a signal receiving device according to still another embodiment of the present application.

Reference may be made to FIG. 17 which is a schematic structural diagram of a signal receiving device according to still another embodiment of the present application. The signal receiving device in this embodiment includes an array antenna 1710, a control circuit 1720, a memory 1730 and a processor 1740. The array antenna 1710 includes at least two active antennas, where each active antenna is surrounded by at least two different parasitic antennas, respective parasitic antennas are respectively coupled to controllable loads, and the controllable loads are respectively coupled to the control circuit 1720. The processor 1740 is respectively coupled to the control circuit 1720 and the memory 1730.

The array antenna 1710 is configured to adjust transmitting directional diagrams by adjusting reactance of the parasitic antennas and by adjusting a transmitting beamforming vector via a transmitting link;

The control circuit 1720 is configured to adjust reactance of the parasitic antennas;

The memory 1730 is configured to store programs and data;

The processor 1740 is configured to receive a mode command, and determine whether a signal transmitting device uses a multiplexing mode or a beamforming mode according to the mode command; if the signal transmitting device uses the multiplexing mode, select an orthogonal receiving combination, and adjusting reactance of the controllable loads in the array antenna 1710 via the control circuit 1720 according to the orthogonal receiving combination to receive a signal; if the signal transmitting device uses the beamforming mode, select a relevant receiving combination, and adjust reactance of the controllable loads in the array antenna 1710 via the control circuit 1720 according to the relevant receiving combination, and adjust receiving directional diagrams of the active antennas according to a receiving beamforming vector to receive a signal. The receiving beamforming vector is conjugation of a left singular vector corresponding to the first way beam gain after a singular value decomposition is performed to a channel transmission matrix When selecting the orthogonal receiving combination, the processor 1740 is further configured to traverse different reactance of the controllable loads within a predefined range to acquire multiple sets of receiving direction vector combinations; the step of selecting the orthogonal receiving combination includes steps of: traversing the receiving direction vector combinations acquired to acquire at least one set of receiving direction vector combinations which enables the receiving directional diagram of each active antenna to be orthogonal so as to form at least one set of orthogonal receiving combinations; determining whether the signal transmitting device uses a slow fading mode or a fast fading mode according to the mode command; if the signal transmitting device uses the slow fading mode, selecting from the at least one set of orthogonal receiving combinations a set of orthogonal receiving combination which maximizes channel capacity; if the signal transmitting device uses the fast fading mode, dividing time frequency resources of the received signal into resource blocks which have the same number as that of orthogonal receiving combinations, where each resource block selects a set of orthogonal receiving combination correspondingly.

When selecting the relevant receiving combination, the processor 1740 is further configured to traversing different reactance of the controllable loads within a predefined range to acquire multiple sets of receiving direction vector combinations; determine whether relevance of each set of receiving direction vector combination is greater than a threshold value; if greater than the threshold value, then store the set of receiving direction vector combination to form at least one set of relevant receiving combinations; determine whether the signal transmitting device uses a slow fading mode or a fast fading mode according to the mode command; if the signal transmitting device uses the slow fading mode, select from the at least one set of relevant receiving combinations a set of relevant receiving combination which maximizes a first way beam gain; if the signal transmitting device uses the fast fading mode, divide time frequency resources of the received signal into resource blocks which have the same number as that of relevant receiving combinations, where each resource block selects a set of relevant receiving combination correspondingly.

The present application further provides an array antenna, including at least two active antennas, where each active antenna is surrounded by at least two different parasitic antennas, respective parasitic antennas are respectively coupled to controllable loads, and the controllable loads are respectively coupled to a control circuit. For a specific structure, reference may be made to FIG. 1 and relevant descriptions thereof, which will not be repeated herein.

In several embodiments provided in the present application, it should be understood that the disclosed system, apparatus, and method may be implemented in other manners. For example, the described apparatus embodiments are merely exemplary. For example, the module or unit division is merely a logical function division and there may be other division mode in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve objectives of solutions of the embodiments.

In addition, functional units in the embodiments of the present application may be integrated into one processing unit, or each of the units may exist alone physically, or two or more units are integrated into one unit. The integrated unit may be implemented in a form of hardware or software functional unit.

When the integrated unit is implemented in a form of a software functional unit and sold or used as an independent product, the integrated unit may be stored in a computer-readable storage medium. Based on such an understanding, essentially, technical solutions of the present application, or parts contributing to the prior art, or all or a part of the technical solutions may be implemented in a form of a software product. The computer software product is stored in a storage medium, and includes several instructions for instructing a computer device (which may be a personal computer, a server, or a network device) or a processor (processor) to perform all or a part of the steps of the methods described in the embodiments of the present application. The foregoing storage medium includes: any medium that can store program codes, such as a USB flash disk, a portable hard disk, a read-only memory (ROM, Read-Only Memory), a random access memory (RAM, Random Access Memory), a magnetic disk, or an optical disc.

What is claimed is:

1. A method for transmitting data using at least two active antennas, wherein each active antenna is surrounded by at least two different parasitic antennas, wherein respective parasitic antennas are respectively coupled to controllable loads, and wherein the controllable loads are respectively coupled to a control circuit, the method comprising:
   determining, by a signal transmitting device, whether a downlink channel is in a good state according to channel change predictions, channel quality report feedback or uplink data transmission conditions; and
   if the channel is in the good state, selecting an orthogonal transmitting combination, and adjusting reactance of the controllable loads via the control circuit according to the orthogonal transmitting combination, and bearing the data of the signal transmitting device in a mode command by using a multiplexing mode to transmit data to a signal receiving device; or if the channel is not in the good state, selecting a relevant transmitting combination, and adjusting the reactance of the controllable loads via the control circuit according to the relevant transmitting combination, adjusting transmitting directional diagrams of the active antennas according to a transmitting beamforming vector to transmit data, and bearing the data of the signal transmitting device in the mode command by using a beamforming mode to transmit it to the signal receiving device.

2. The method according to claim 1, wherein, before selecting the orthogonal transmitting combination, the method further comprises:
   traversing different reactance of the controllable loads within a predefined range to acquire multiple sets of transmitting direction vector combinations; and
   wherein selecting the orthogonal transmitting combination further comprises:
   traversing the transmitting direction vector combinations acquired to acquire at least one set of transmitting direction vector combination which enables the transmitting directional diagram of each active antenna to be orthogonal so as to form at least one set of orthogonal transmitting combinations;
   determining whether the downlink channel is in a slow fading condition or a fast fading condition according to the channel change predictions, the channel quality report feedback or the uplink data transmission conditions; and
   if the channel is in the slow fading condition, selecting from the at least one set of orthogonal transmitting combinations a set of orthogonal transmitting combination which maximizes channel capacity, and bearing the data of the signal transmitting device in the mode command by using a slow fading mode to transmit it to the signal receiving device; or if the channel is in the fast fading condition, dividing time frequency resources of the transmitted data into resource blocks which have the same number as that of the orthogonal transmitting combinations, wherein each resource block selects a set of orthogonal transmitting combination correspondingly, and bearing the data of the signal transmitting device in the mode command by using a fast fading mode to transmit it to the signal receiving device.

3. The method according to claim 1, wherein selecting the relevant transmitting combination further comprises:
   traversing different reactance of the controllable loads within a predefined range to acquire multiple sets of transmitting direction vector combinations;
   determining whether relevance of each set of transmitting direction vector combination is greater than a threshold value;
   based on the relevance of the transmitting direction vector combination being greater than the threshold value, storing the set of transmitting direction vector combination to form at least one set of relevant transmitting combinations;
   determining whether the downlink channel is in a slow fading condition or a fast fading condition according to the channel change predictions, the channel quality report feedback or the uplink data transmission conditions; and
   if the channel is in the slow fading condition, selecting from the at least one set of relevant transmitting combinations a set of relevant transmitting combination which maximizes a first beam gain, and the data of bearing the signal transmitting device in the mode command by using a slow fading mode to transmit it to the signal receiving device; or if the channel is in the fast fading condition, dividing time frequency resources of the transmitted data into resource blocks which have the same number as that of the relevant transmitting combinations, wherein each resource block selects a set of relevant transmitting combination correspondingly, and bearing the data of the signal transmitting device in the mode command by using a fast fading mode to transmit it to the signal receiving device.

4. The method according to claim 3, wherein the transmitting beamforming vector is a right singular vector corresponding to the first beam gain after a singular value decomposition is performed on a channel transmission matrix.

5. A signal transmitting device, comprising:
   at least two active antennas, wherein each active antenna is surrounded by at least two different parasitic antennas, wherein respective parasitic antennas are respectively coupled to controllable loads, and wherein the controllable loads are respectively coupled to a control circuit;
   a determining module, configured to determine whether a downlink channel is in a good state according to channel change predictions, channel quality report feedback or uplink data transmission conditions, and to transmit a first determining result to a selecting and adjusting module; and
   the selecting and adjusting module, configured to:
   receive the first determining result;

when the channel is in the good state, select an orthogonal transmitting combination, and adjust reactance of the controllable loads via the control circuit according to the orthogonal transmitting combination to transmit data, and bear the data of the signal transmitting device in a mode command by using a multiplexing mode to transmit data to a signal receiving device; and when the channel is not in the good state, select a relevant transmitting combination, and adjust the reactance of the controllable loads via the control circuit according to the relevant transmitting combination, and adjust transmitting directional diagrams of the active antennas according to a transmitting beamforming vector to transmit data, and bear the data of the signal transmitting device in the mode command by using a beamforming mode to transmit it to the signal receiving device.

6. The signal transmitting device according to claim 5, wherein the selecting and adjusting module comprises:

a first traversing unit, configured to traverse different reactance of the controllable loads within a predefined range to acquire multiple sets of transmitting direction vector combinations, and transmit the multiple sets of transmitting direction vector combinations to a second traversing unit;

the second traversing unit, configured to traverse the transmitting direction vector combinations acquired to acquire at least one set of transmitting direction vector combination which enables the transmitting directional diagram of each active antenna to be orthogonal so as to form at least one set of orthogonal transmitting combinations, and transmit the at least one set of orthogonal transmitting combinations to a first selecting unit;

a first determining unit, configured to determine whether the downlink channel is in a slow fading condition or in a fast fading condition according to the channel change predictions, the channel quality report feedback or the uplink data transmission conditions, and transmit a second determining result to the first selecting unit; and the first selecting unit, configured to:

receive the at least one set of orthogonal transmitting combinations and the second determining result;

when the channel is in the slow fading condition, select from the at least one set of orthogonal transmitting combinations a set of orthogonal transmitting combination which maximizes channel capacity, and bear the data of the signal transmitting device in the mode command by using a slow fading mode to transmit it to the signal receiving device; and when the channel is in the fast fading condition, divide time frequency resources of the transmitted data into resource blocks which have the same number as that of orthogonal transmitting combinations, wherein each resource block selects a set of orthogonal transmitting combination correspondingly, and bear the data of the signal transmitting device in the mode command by using a fast fading mode to transmit it to the signal receiving device.

7. The signal transmitting device according to claim 5, wherein the selecting and adjusting module comprises:

a third traversing unit, configured to traverse different reactance of the controllable loads within a predefined range to acquire multiple sets of transmitting direction vector combinations, and transmit the multiple sets of transmitting direction vector combinations to a second determining unit;

the second determining unit, configured to receive the multiple sets of transmitting direction vector combinations, determine whether relevance of each set of transmitting direction vector combination is greater than a threshold value, and transmit a third determining result to a storing unit;

the storing unit, configured to receive the third determining result, when the relevance of the transmitting direction vector combination is greater than the threshold value, store the set of transmitting direction vector combination to form at least one set of relevant transmitting combinations, and transmit the at least one set of relevant transmitting combinations to a second selecting unit;

a third determining unit, configured to determine whether the downlink channel is in a slow fading condition or in a fast fading condition according to the channel change predictions, the channel quality report feedback or the uplink data transmission conditions, and transmit a fourth determining result to the second selecting unit; and the second selecting unit, configured to:

receive the at least one set of relevant transmitting combinations and the fourth determining result;

when the channel is in the slow fading condition, select from the at least one set of relevant transmitting combinations a set of relevant transmitting combination which maximizes a first beam gain, and bear the data of the signal transmitting device in the mode command by using a slow fading mode to transmit it to the signal receiving device; and when the channel is in the fast fading condition, divide time frequency resources of the transmitted data into resource blocks which have the same number as that of relevant transmitting combinations, wherein each resource block selects a set of relevant transmitting combination correspondingly, and bear the data of the signal transmitting device in the mode command by using a fast fading mode to transmit it to the signal receiving device.

8. The signal transmitting device according to claim 7, wherein the transmitting beamforming vector is a right singular vector corresponding to the first beam gain after a singular value decomposition is performed on a channel transmission matrix.

9. A signal receiving device, comprising:

at least two active antennas, wherein each active antenna is surrounded by at least two different parasitic antennas, wherein respective parasitic antennas are respectively coupled to controllable loads, and wherein the controllable loads are respectively coupled to a control circuit;

a determining module, configured to receive a mode command, and determine whether a signal transmitting device uses a multiplexing mode or a beamforming mode according to the mode command, and transmit a first determining result to a selecting and adjusting module; and the selecting and adjusting module, configured to:

receive the first determining result;

when the signal transmitting device uses the multiplexing mode, select an orthogonal receiving combination, and adjust reactance of the controllable loads via the control circuit according to the orthogonal receiving combination to receive a signal; and when the signal transmitting device uses the beamforming mode, select a relevant receiving combination, and adjusting the reactance of the controllable loads via the control circuit according to the relevant receiving combination, and adjust receiving directional diagrams of the active antennas according to a receiving beamforming vector to receive the signal.

10. The signal receiving device according to claim 9, wherein the selecting and adjusting module comprises:
a first traversing unit, configured to traverse different reactance of the controllable loads within a predefined range to acquire multiple sets of receiving direction vector combinations, and transmit the multiple sets of receiving direction vector combinations to a second traversing unit;
the second traversing unit, configured to traverse the receiving direction vector combinations acquired to acquire at least one set of receiving direction vector combination which enables the receiving directional diagram of each active antenna to be orthogonal so as to form at least one set of orthogonal receiving combinations, and transmit the at least one set of orthogonal receiving combinations to a first selecting unit;
a first determining unit, configured to determine whether the signal transmitting device uses a slow fading mode or a fast fading mode according to the mode command, and transmit a second determining result to the first selecting unit; and
the first selecting unit is configured to:
receive the at least one set of orthogonal receiving combinations and the second determining result;
when the signal transmitting device uses the slow fading mode, select from the at least one set of orthogonal receiving combinations a set of orthogonal receiving combination which maximizes channel capacity; and
when the signal transmitting device uses the fast fading mode, divide time frequency resources of the received signal into resource blocks which have the same number as that of orthogonal receiving combinations, wherein each resource block selects a set of orthogonal receiving combination correspondingly.

11. The signal receiving device according to claim 9, wherein the selecting and adjusting module comprises:
a third traversing unit, configured to traverse different reactance of the controllable loads within a predefined range to acquire multiple sets of receiving direction vector combinations, and transmit the multiple sets of receiving direction vector combinations to second determining unit;
the second determining unit, configured to receive the multiple sets of receiving direction vector combinations, determine whether relevance of each set of receiving direction vector combination is greater than a threshold value, and transmit a third determining result to a second selecting unit;
a storing unit, configured to: when the relevance of the receiving direction vector combination is greater than the threshold value, store the set of receiving direction vector combination to form at least one set of relevant receiving combinations, and transmit the at least one set of relevant receiving combinations to the second selecting unit;
a third determining unit, configured to receive the at least one set of relevant receiving combinations, determine whether the signal transmitting device uses a slow fading mode or a fast fading mode according to the mode command, and transmit a fourth determining result to the second selecting unit; and
the second selecting unit, configured to:
receive the at least one set of relevant receiving combinations and the fourth determining result;
when the signal transmitting device uses the slow fading mode, select from the at least one set of relevant receiving combinations a set of relevant receiving combination which maximizes a first beam gain; and
when the signal transmitting device uses the fast fading mode, divide time frequency resources of the received signal into resource blocks which have the same number as that of relevant receiving combinations, wherein each resource block selects a set of relevant receiving combination correspondingly.

12. The signal receiving device according to claim 11, wherein the receiving beamforming vector is a conjugation of a left singular vector corresponding to the first beam gain after a singular value decomposition is performed on a channel transmission matrix.

* * * * *

UNITED STATES PATENT AND TRADEMARK OFFICE
CERTIFICATE OF CORRECTION

PATENT NO. : 9,281,878 B2  
APPLICATION NO. : 14/707618  
DATED : March 8, 2016  
INVENTOR(S) : Wu et al.

Page 1 of 1

It is certified that error appears in the above-identified patent and that said Letters Patent is hereby corrected as shown below:

Title page, Item (30), Foreign Application Priority Data, "Jun. 24, 2013" should read -- Nov. 12, 2013 --.

Signed and Sealed this  
Ninth Day of August, 2016

Michelle K. Lee  
*Director of the United States Patent and Trademark Office*